(12) United States Patent
Kwon et al.

(10) Patent No.: US 9,961,481 B2
(45) Date of Patent: May 1, 2018

(54) METHOD AND APPARATUS FOR TRANSMITTING A HTTP DATA USING BLUETOOTH IN WIRELESS COMMUNICATION SYSTEM

(71) Applicant: LG ELECTRONICS INC., Seoul (KR)

(72) Inventors: Younghwan Kwon, Seoul (KR); Dokyun Kim, Seoul (KR); Hyeonjae Lee, Seoul (KR); Minsoo Lee, Seoul (KR); Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 15/305,964

(22) PCT Filed: Oct. 15, 2014

(86) PCT No.: PCT/KR2014/009694
§ 371 (c)(1),
(2) Date: Oct. 21, 2016

(87) PCT Pub. No.: WO2015/163547
PCT Pub. Date: Oct. 29, 2015

(65) Prior Publication Data
US 2017/0048656 A1 Feb. 16, 2017

Related U.S. Application Data

(60) Provisional application No. 62/019,853, filed on Jul. 1, 2014, provisional application No. 61/982,292, filed on Apr. 21, 2014.

(51) Int. Cl.
*H04W 4/00* (2009.01)
*H04L 12/66* (2006.01)
*H04L 29/08* (2006.01)

(52) U.S. Cl.
CPC ............ *H04W 4/008* (2013.01); *H04L 12/66* (2013.01); *H04L 67/02* (2013.01); *H04L 67/28* (2013.01)

(58) Field of Classification Search
CPC ........ H04L 12/66; H04L 67/02; H04L 29/08; H04L 67/28; H04W 4/008; H04W 52/0203
See application file for complete search history.

(56) References Cited

U.S. PATENT DOCUMENTS

| 6,594,697 B1 * | 7/2003 | Praitis | G06F 11/327 707/E17.119 |
| 8,924,799 B2 * | 12/2014 | Banerjee | G06F 11/0769 714/48 |

(Continued)

FOREIGN PATENT DOCUMENTS

| KR | 10-2002-0081183 A | 10/2002 |
| KR | 20020081183 A * | 10/2002 |

(Continued)

*Primary Examiner* — Devan Sandiford
(74) *Attorney, Agent, or Firm* — Birch, Stewart, Kolasch & Birch, LLP

(57) ABSTRACT

The present invention is related to a method for transmitting and receiving data to and from a web server by using Bluetooth communication in a wireless communication system, comprising receiving a first write request including HTTP (Hyper Text Transfer Protocol) request-related information from a first client device; transmitting to a web server HTTP request-related information generated on the basis of information included in the received first write request; receiving an HTTP response message in response to the HTTP request-related information from the web server; notifying the first client device of an HTTP status code indicating the status of data included in the received HTTP response message; and receiving a read request requesting data transmission on the basis of information included in the (Continued)

HTTP status code from the first client device, wherein, in case a second write request is received from a different client device while the first write request is being received, an error response is transmitted to the different client device.

19 Claims, 19 Drawing Sheets

(56) References Cited

U.S. PATENT DOCUMENTS

| | | | | |
|---|---|---|---|---|
| 2002/0124100 A1* | 9/2002 | Adams | G06F 17/30902 | 709/232 |
| 2002/0194498 A1* | 12/2002 | Blight | H04L 29/06 | 726/4 |
| 2003/0140121 A1* | 7/2003 | Adams | G06F 17/30902 | 709/219 |
| 2004/0073811 A1* | 4/2004 | Sanin | H04L 63/0263 | 726/13 |
| 2004/0205765 A1* | 10/2004 | Beringer | H04L 67/02 | 719/311 |
| 2005/0182843 A1* | 8/2005 | Reistad | H04L 41/0233 | 709/230 |
| 2006/0039348 A1* | 2/2006 | Racz | H04L 29/12009 | 370/351 |
| 2006/0274726 A1* | 12/2006 | Wikman | H04L 29/12066 | 370/352 |
| 2008/0031171 A1* | 2/2008 | Joung | H04L 43/028 | 370/310 |
| 2008/0049779 A1* | 2/2008 | Hopmann | H04L 12/2807 | 370/431 |
| 2008/0052384 A1* | 2/2008 | Marl | H04L 12/2807 | 709/223 |
| 2008/0209273 A1* | 8/2008 | Bahl | H04L 41/0681 | 714/37 |
| 2009/0327827 A1* | 12/2009 | L'Heureux | H04L 67/2804 | 714/748 |
| 2011/0295930 A1* | 12/2011 | Morris | H04L 67/42 | 709/203 |
| 2013/0055166 A1* | 2/2013 | Stinger | G06F 17/30592 | 715/853 |
| 2013/0163731 A1* | 6/2013 | Yan | H04M 3/523 | 379/85 |
| 2013/0332782 A1* | 12/2013 | Christena | G06F 11/32 | 714/57 |
| 2014/0032643 A1* | 1/2014 | Dirstine | H04L 67/02 | 709/203 |
| 2014/0068010 A1* | 3/2014 | Nicholson | B60K 35/00 | 709/219 |
| 2014/0150095 A1* | 5/2014 | Zhao | H04L 29/06 | 726/22 |
| 2014/0162582 A1* | 6/2014 | Daly | H04W 76/007 | 455/404.1 |
| 2014/0325260 A1* | 10/2014 | Gladwin | G06F 11/1092 | 714/6.13 |
| 2015/0033335 A1* | 1/2015 | Zhao | H04L 63/1416 | 726/22 |
| 2015/0296027 A1* | 10/2015 | Bak | H04L 67/148 | 709/202 |
| 2015/0324386 A1* | 11/2015 | Calder | G06F 17/30876 | 707/649 |
| 2016/0189143 A1* | 6/2016 | Koeppel | G06K 19/0739 | 705/41 |
| 2016/0205549 A1* | 7/2016 | Hoyer | H04W 12/06 | 713/159 |
| 2017/0237600 A1* | 8/2017 | Patel | H04L 29/08693 | 455/452.2 |

FOREIGN PATENT DOCUMENTS

| | | | |
|---|---|---|---|
| KR | 10-2003-0010002 A | | 2/2003 |
| KR | 20030010002 A | * | 2/2003 |

* cited by examiner

[FIG. 1]
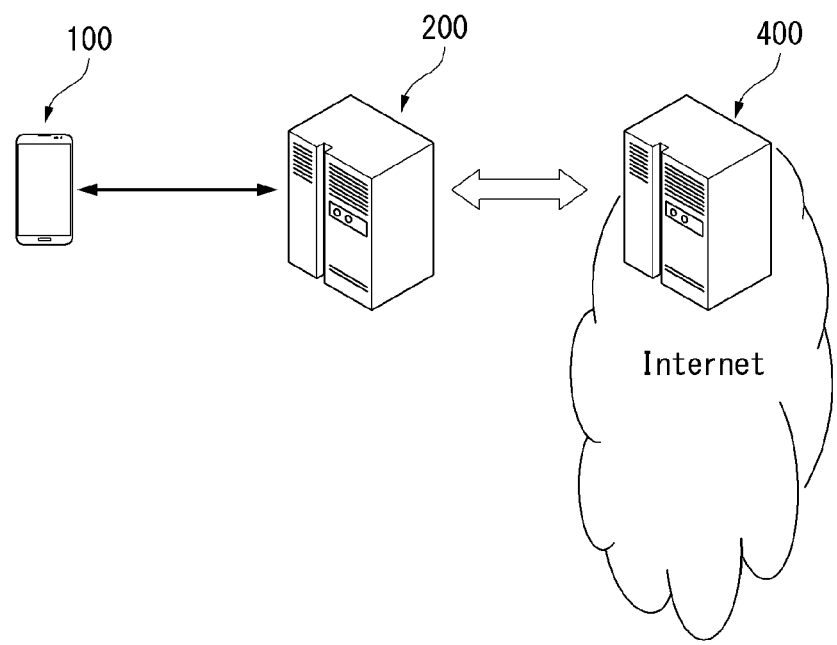

[FIG. 2]
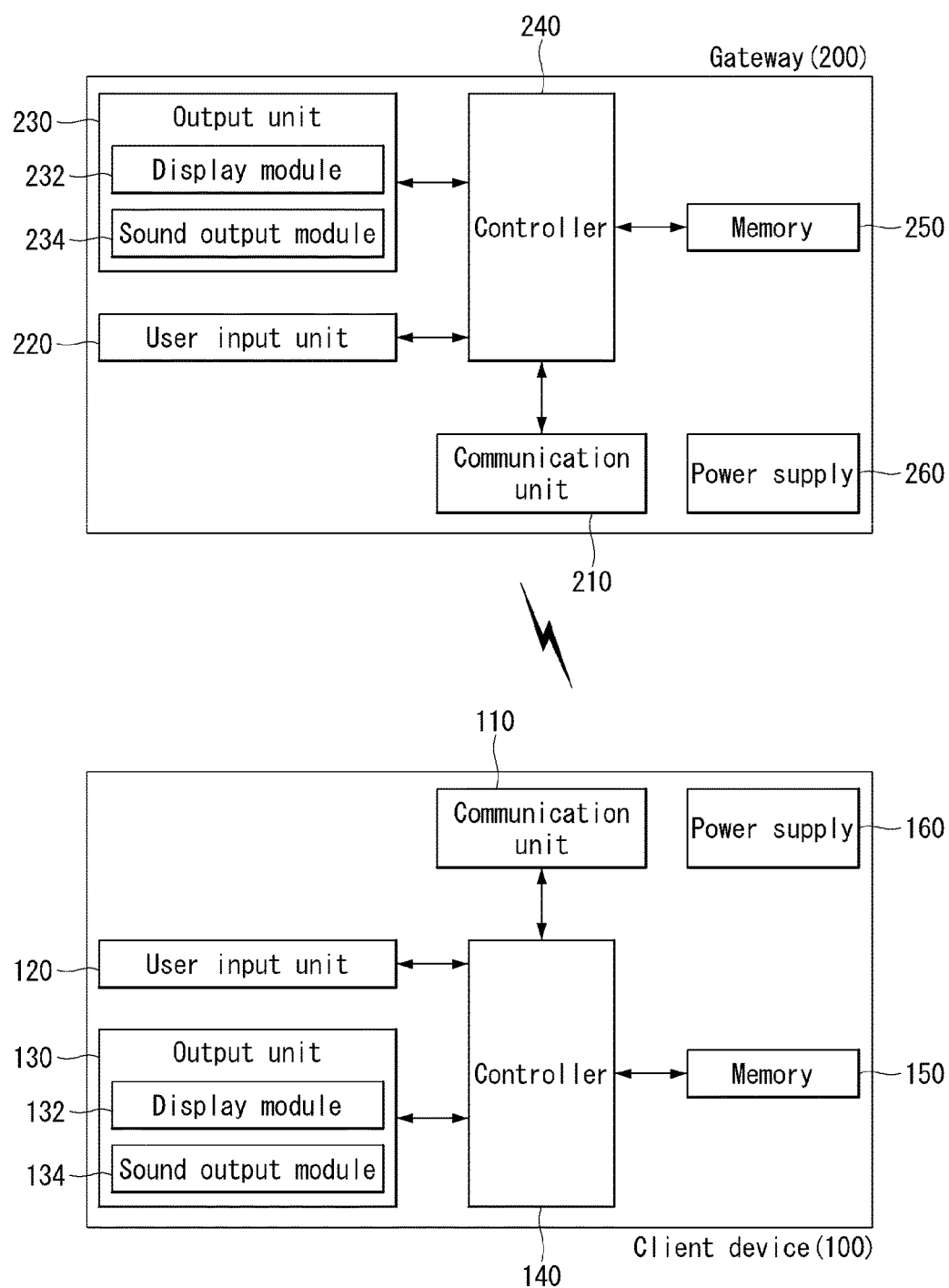

[FIG. 3]
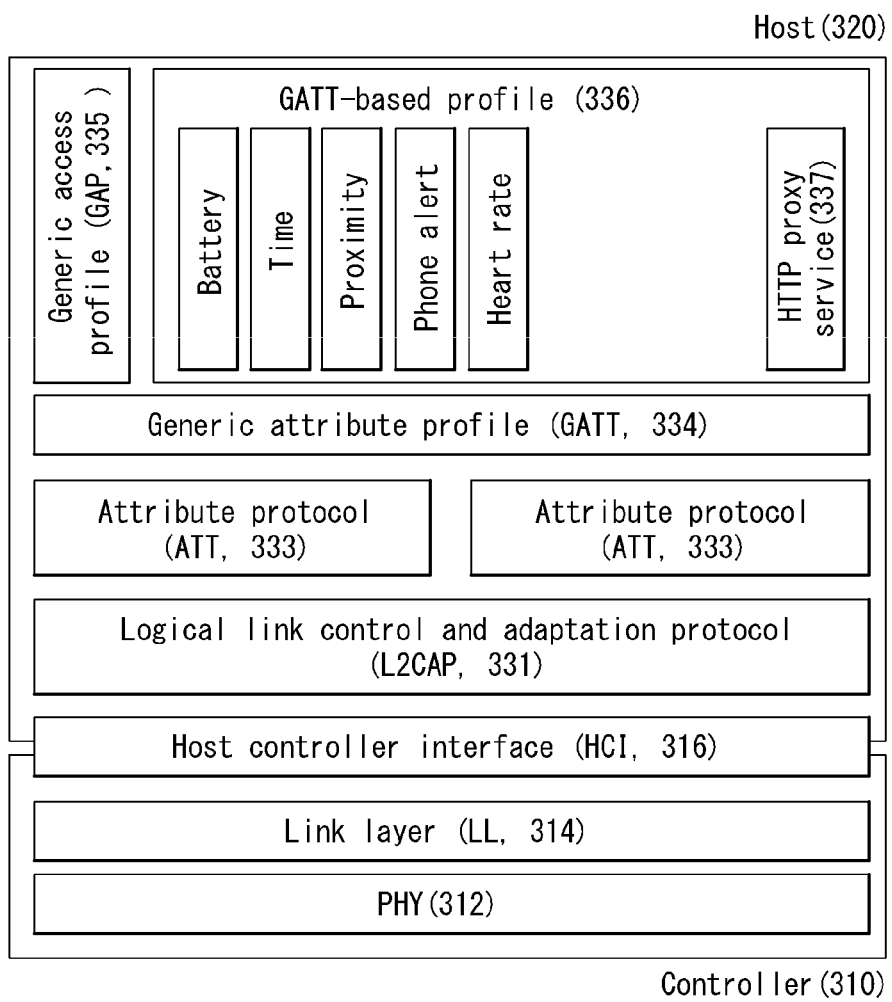

[FIG. 4]
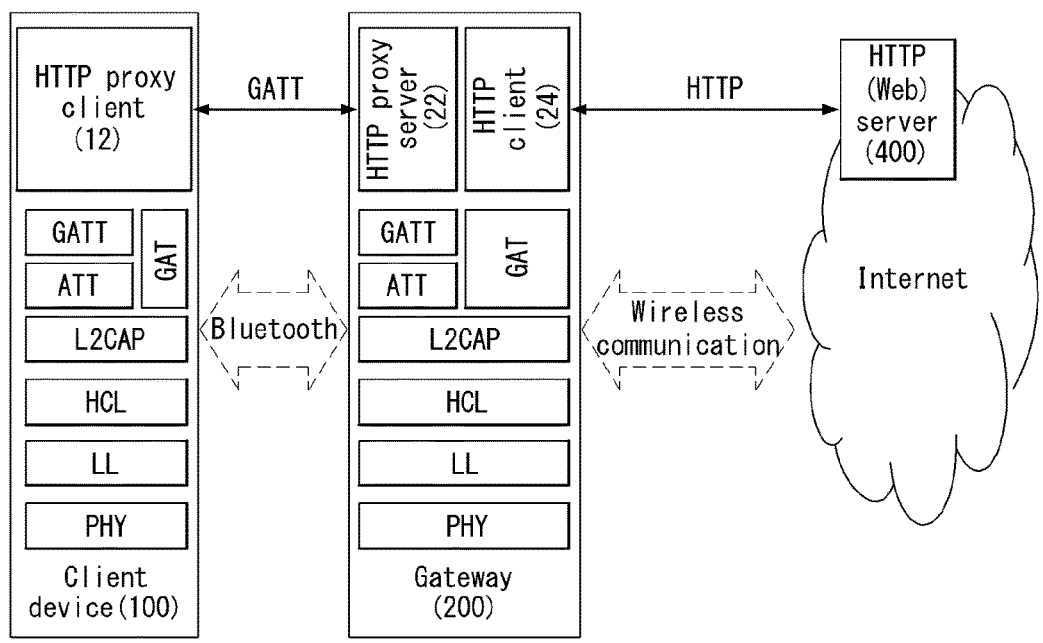

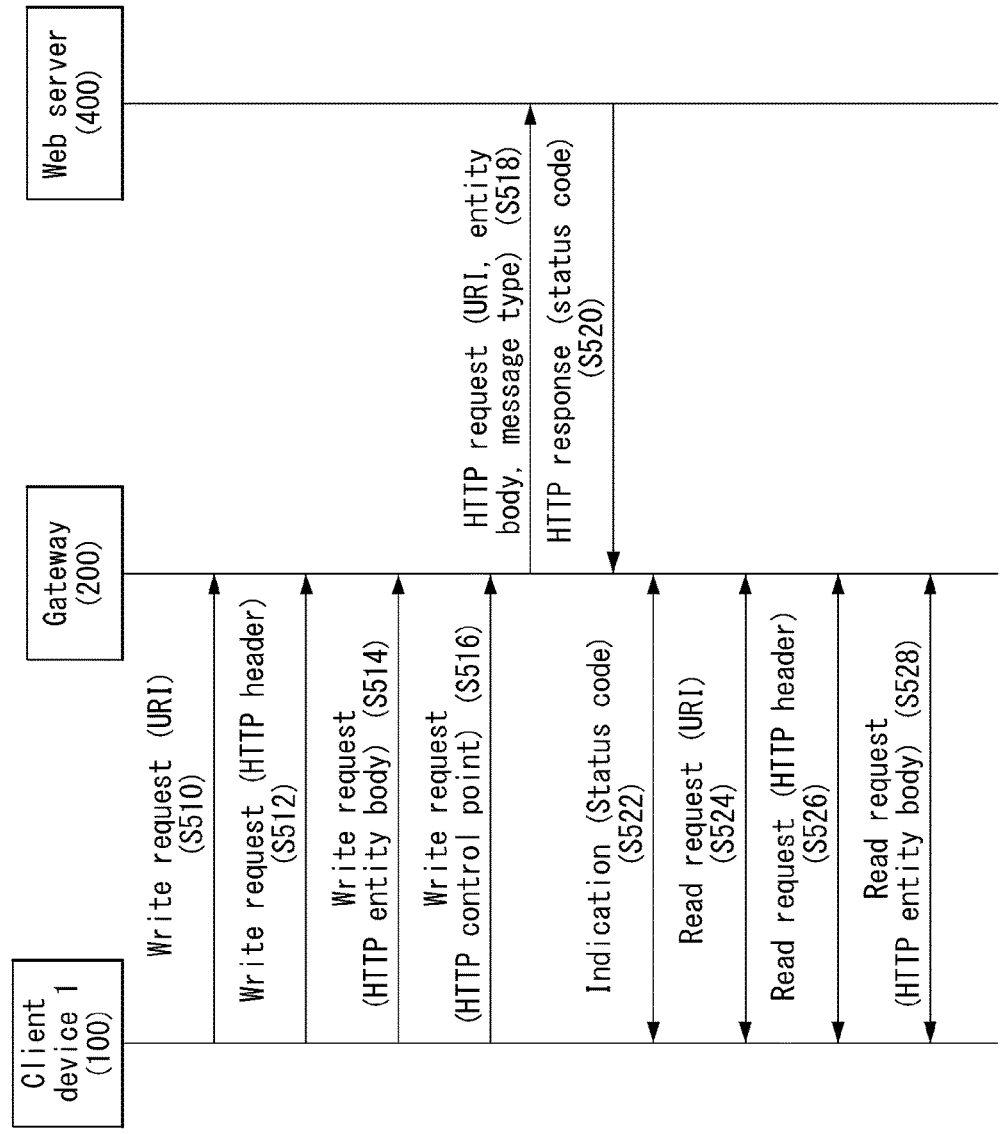
[FIG. 5]

[FIG. 6]
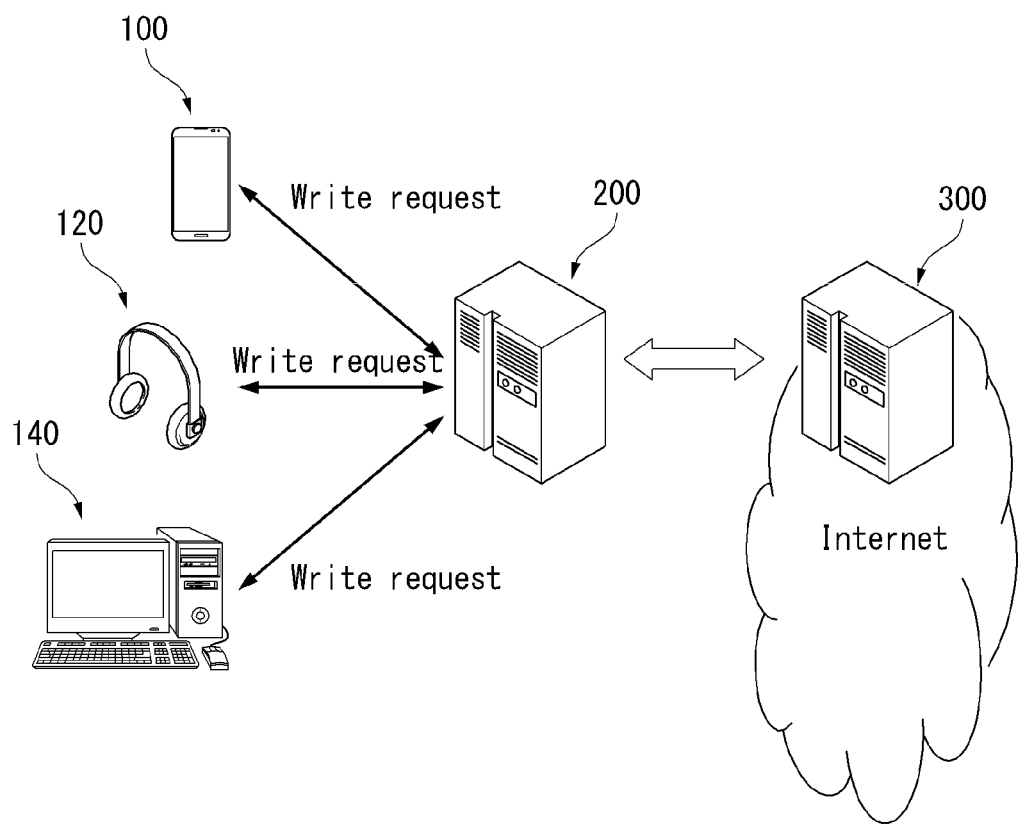

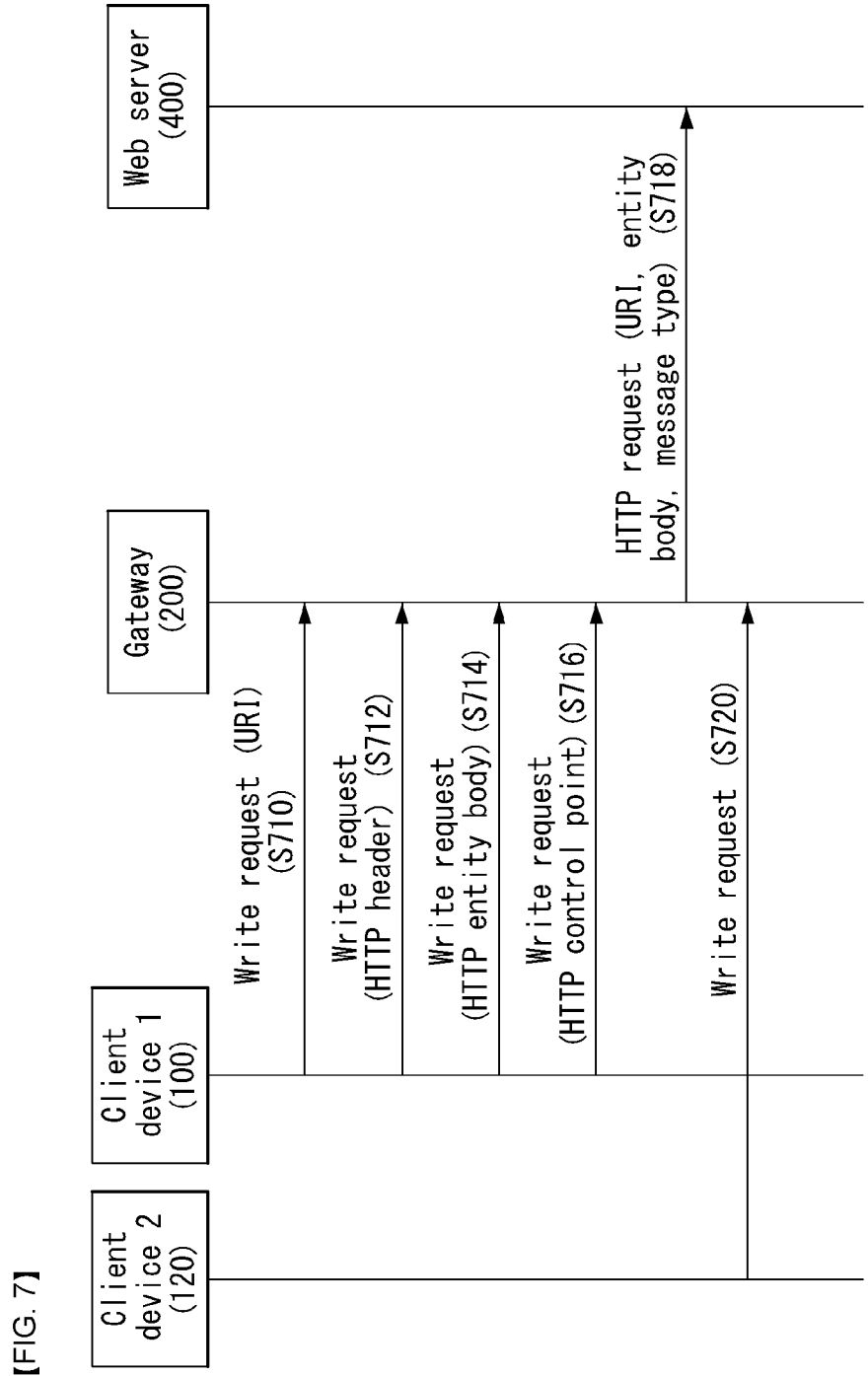
[FIG. 7]

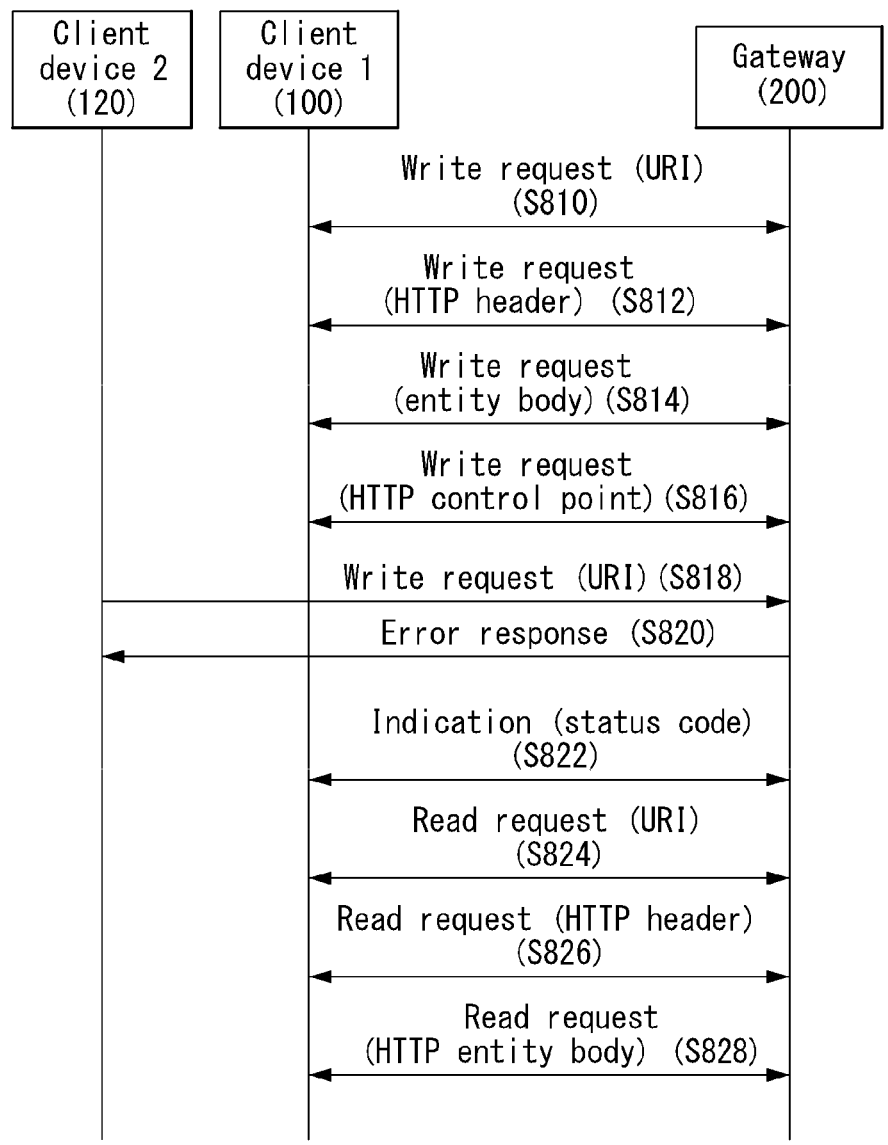
[FIG. 8]

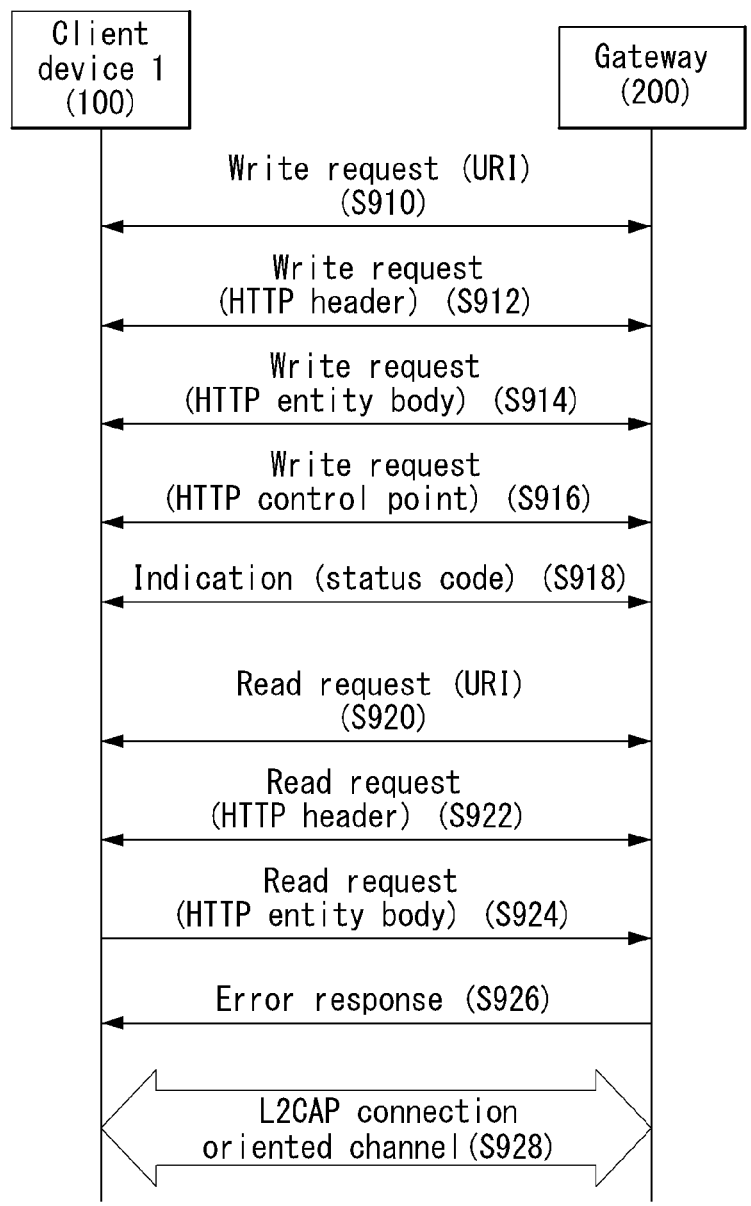
[FIG. 9]

[FIG. 10]
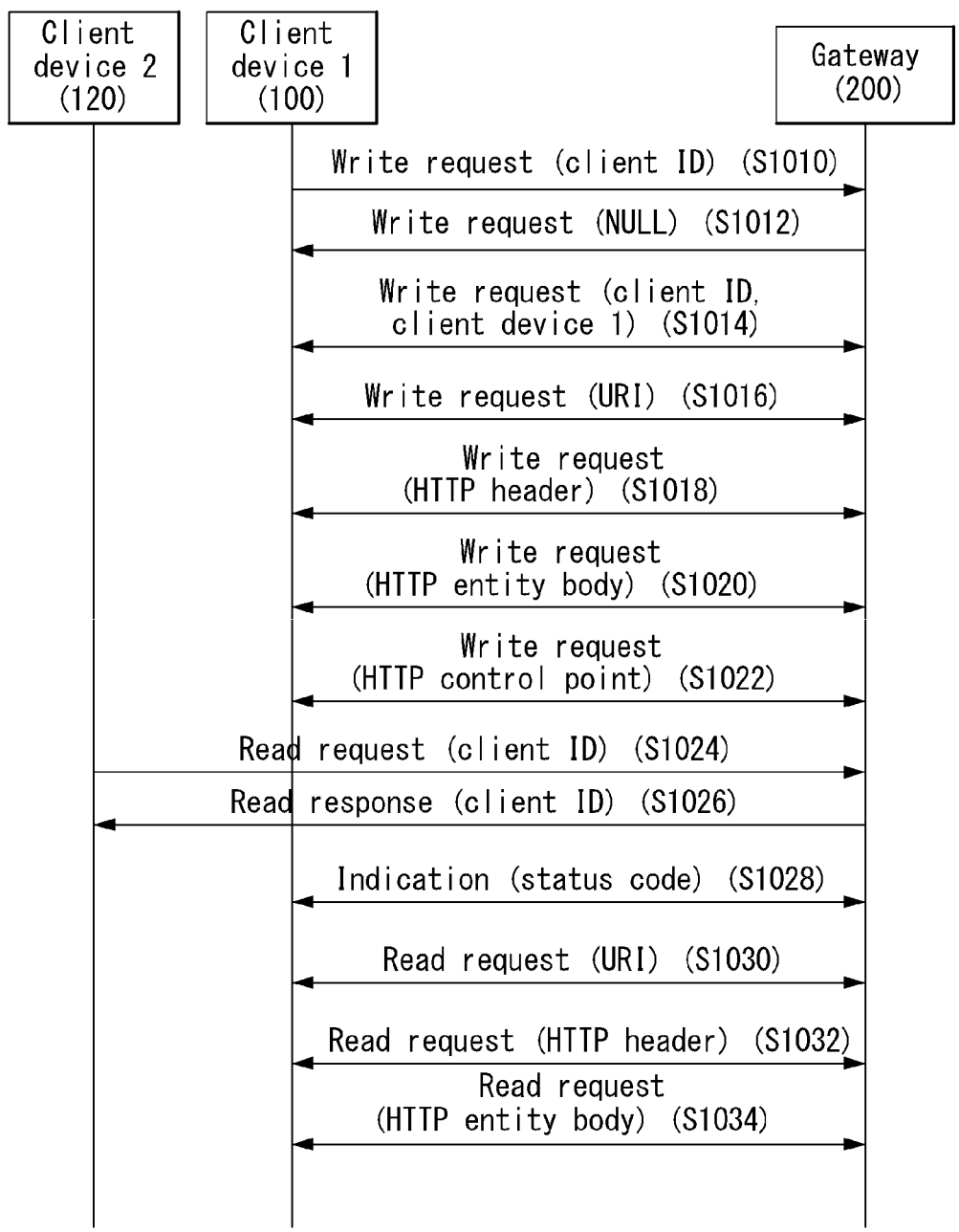

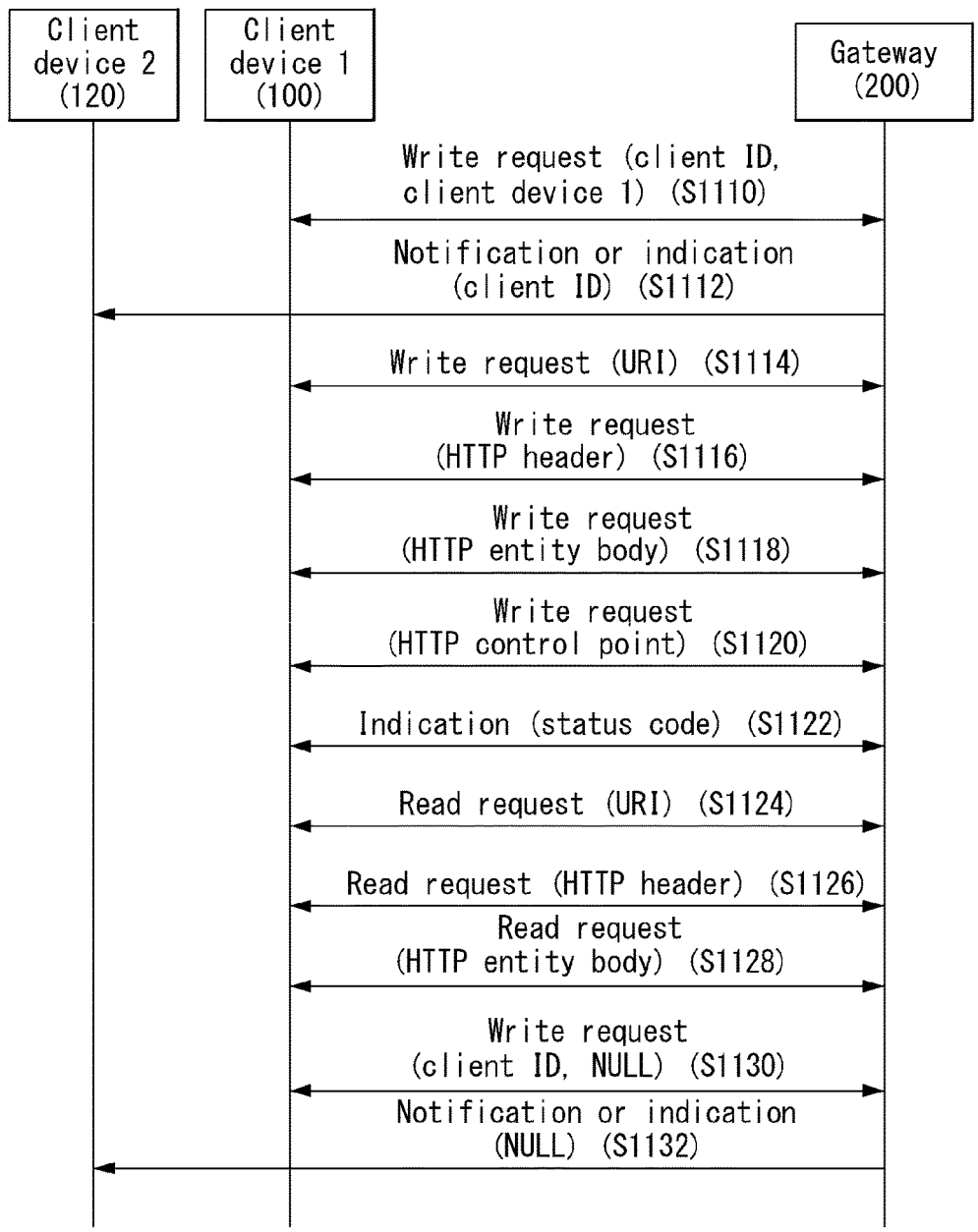
[FIG. 11]

[FIG. 12]
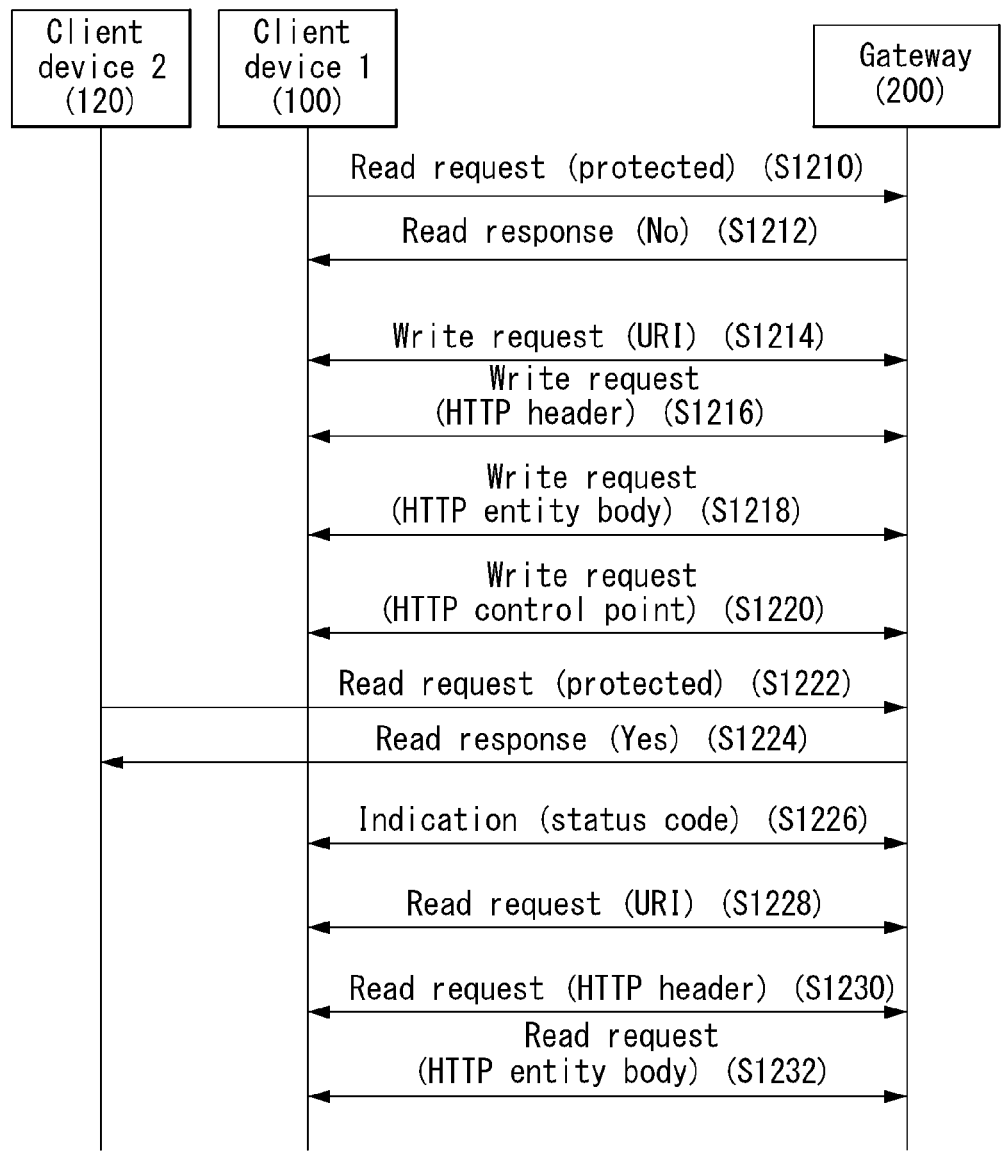

[FIG. 13]
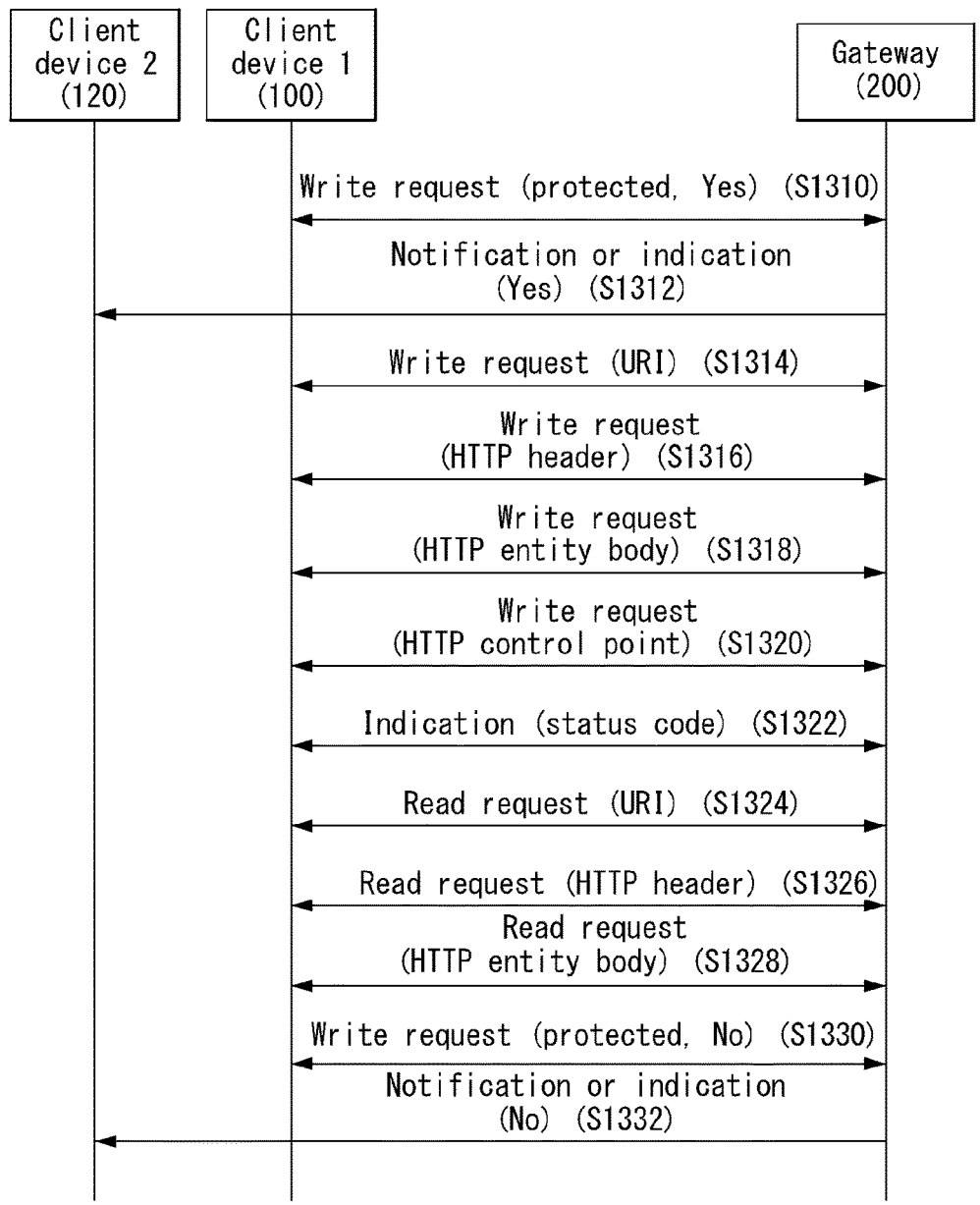

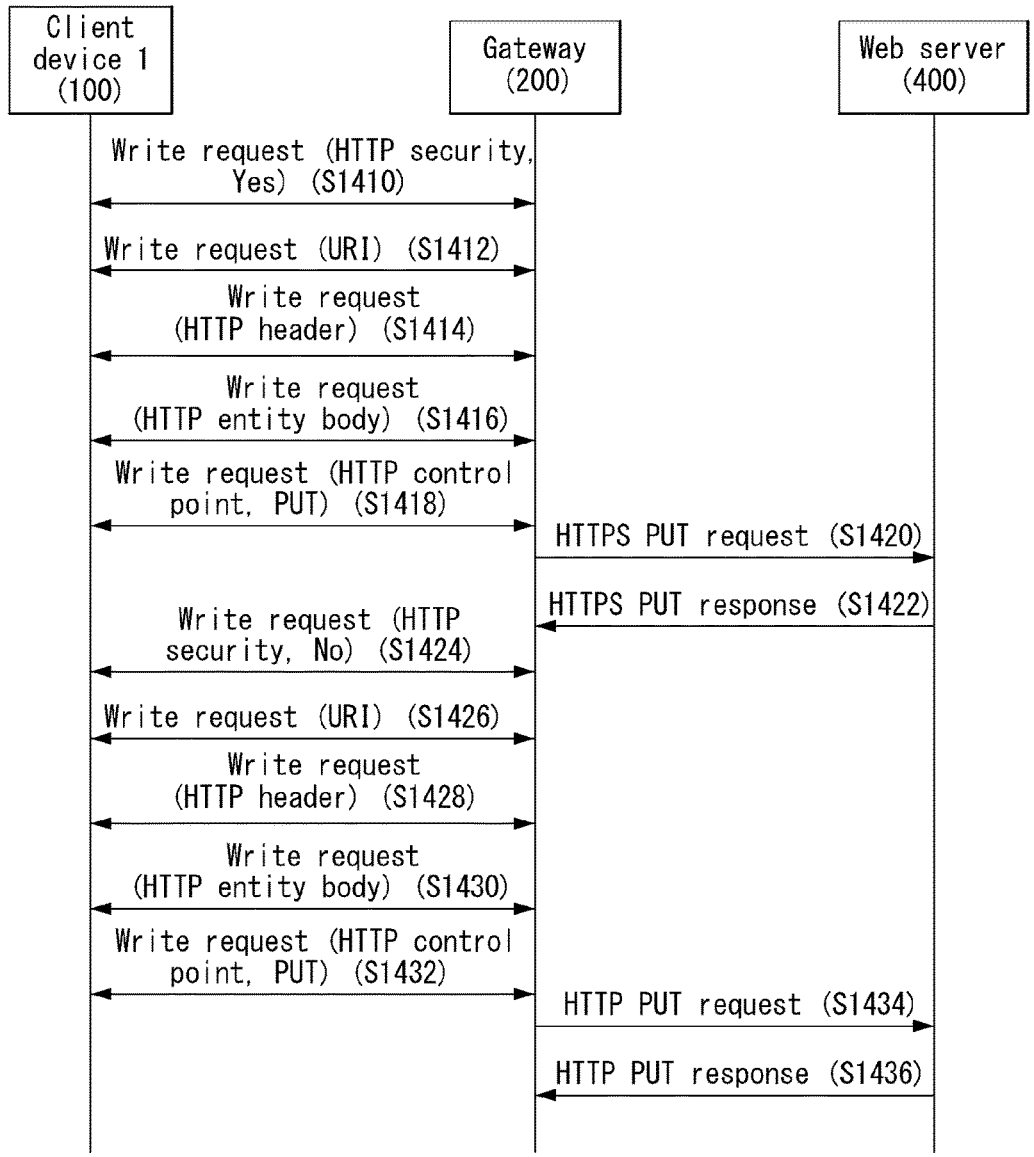
[FIG. 14]

[FIG. 15]
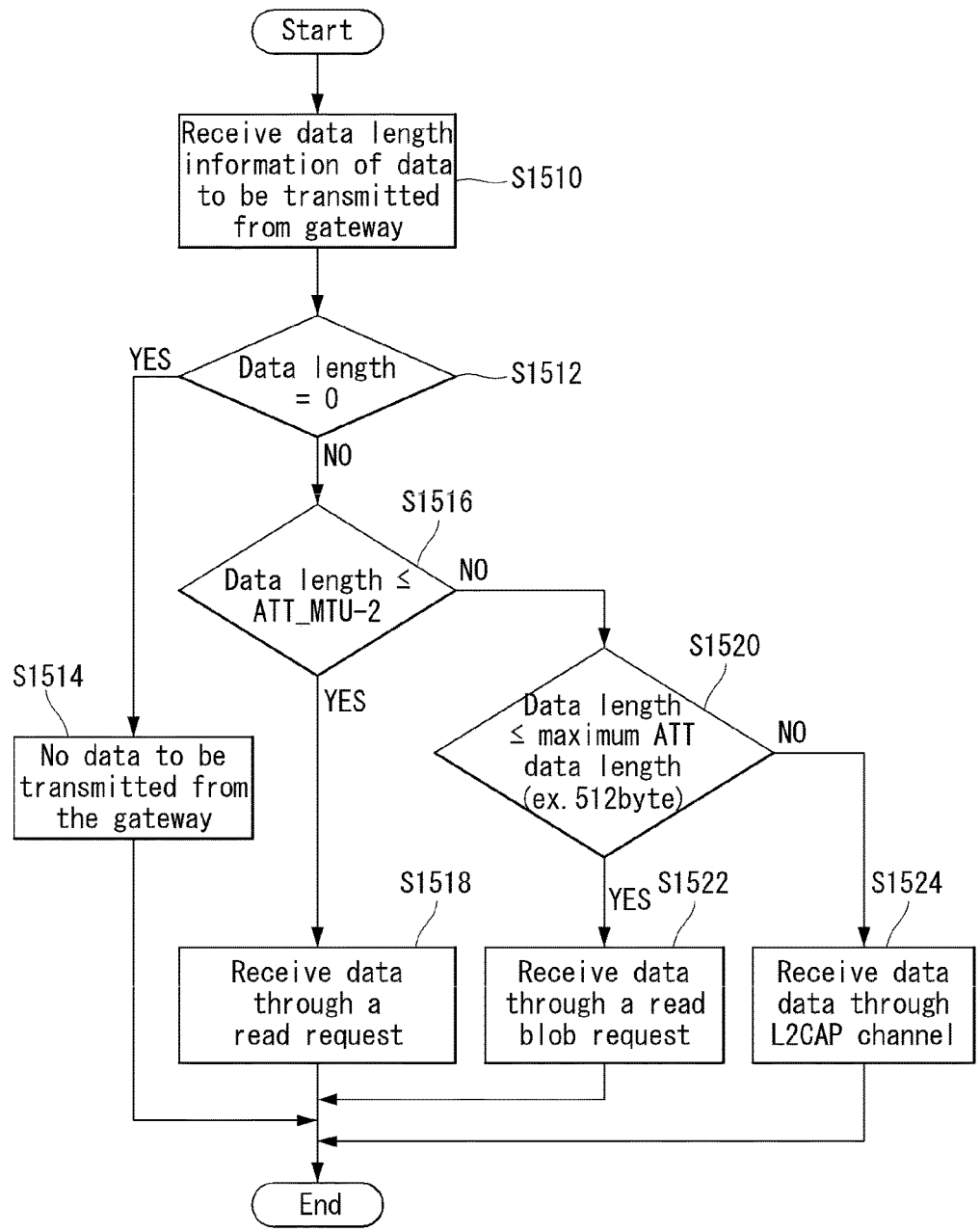

[FIG. 16]
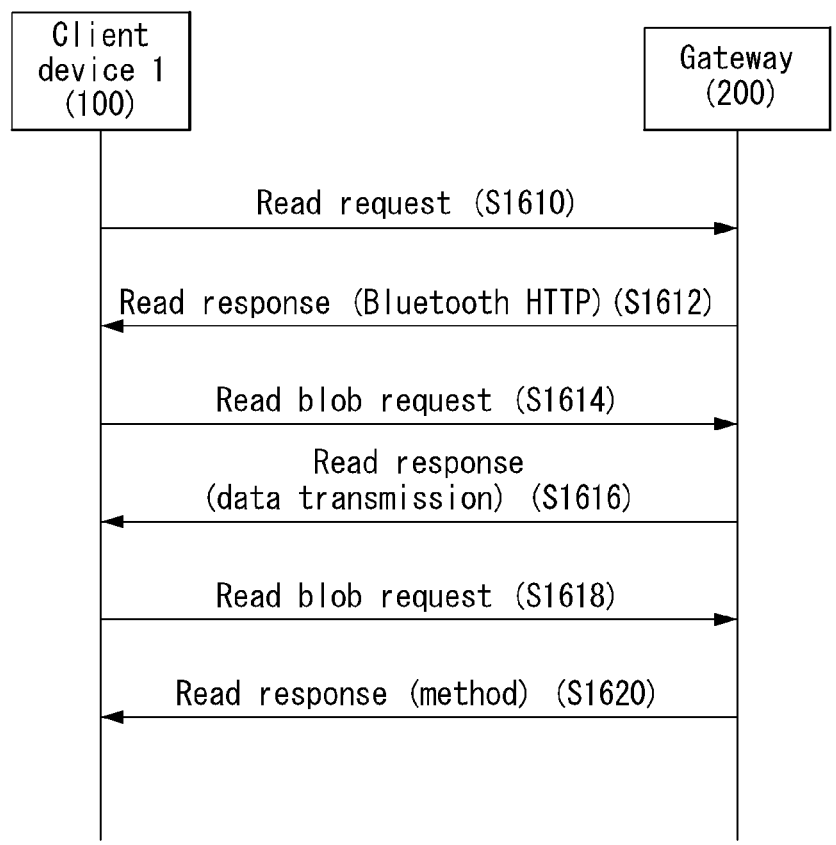

[FIG. 17]
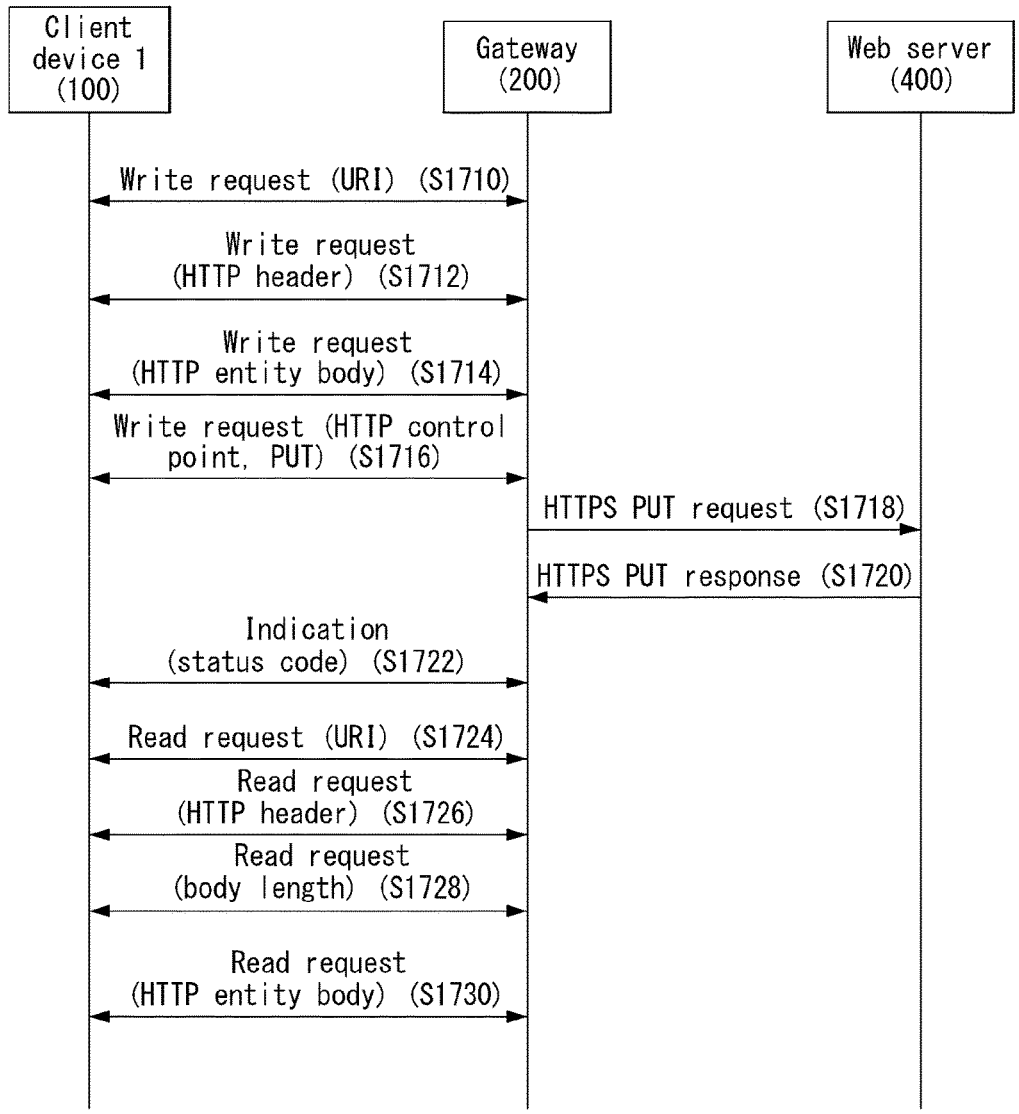

[FIG. 18]
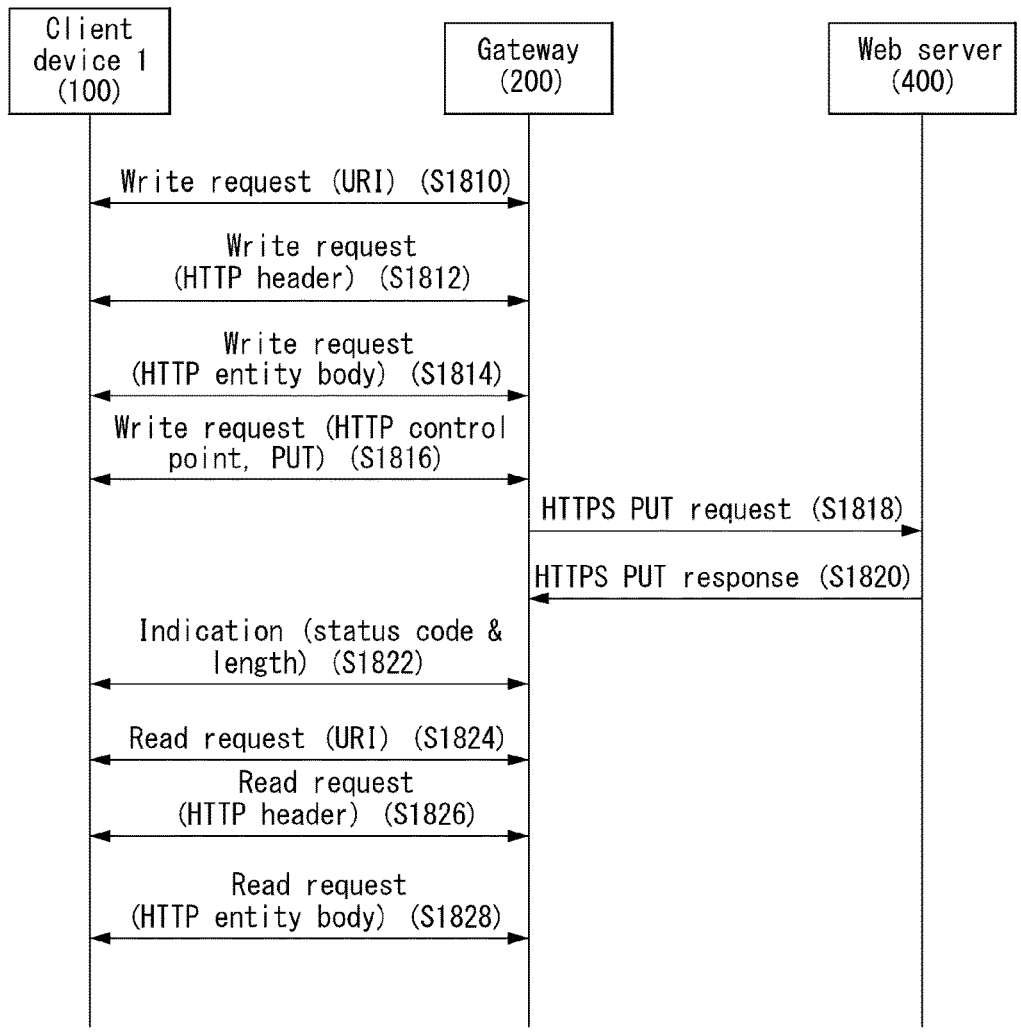

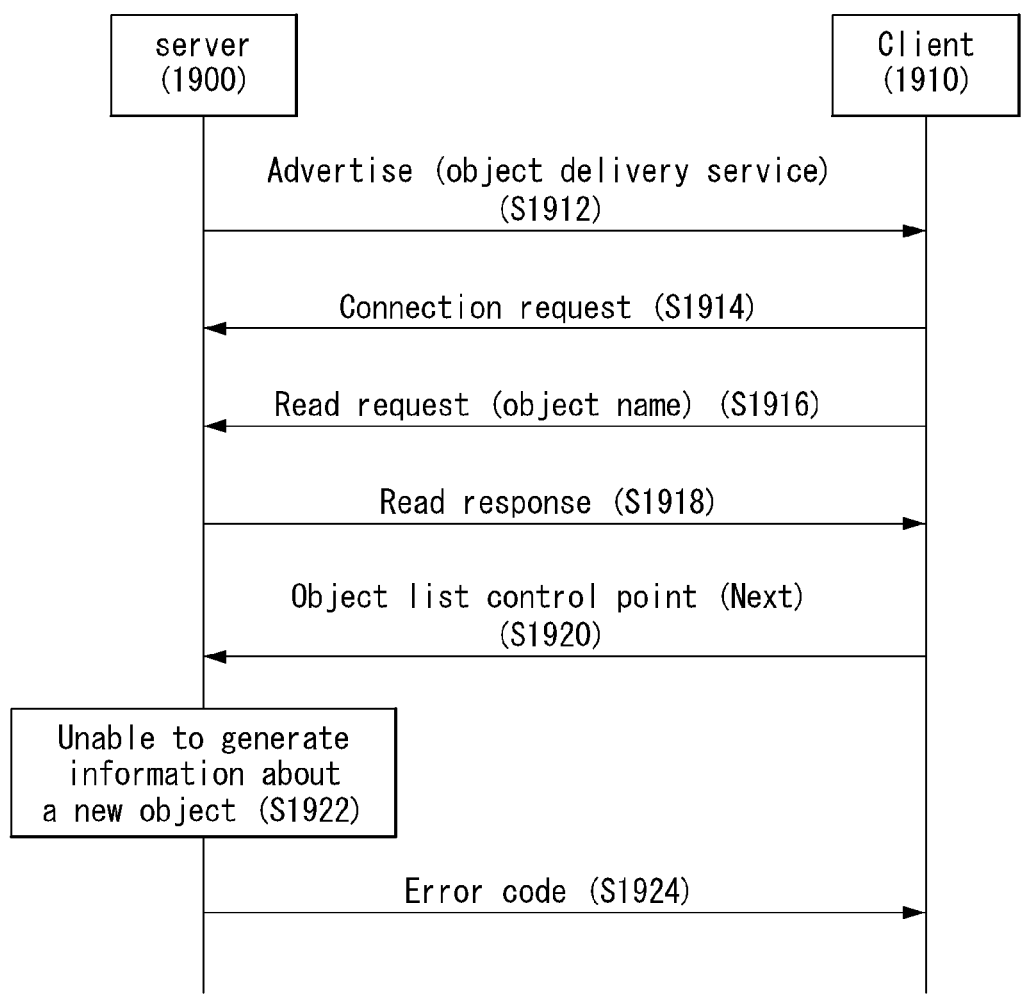

METHOD AND APPARATUS FOR TRANSMITTING A HTTP DATA USING BLUETOOTH IN WIRELESS COMMUNICATION SYSTEM

CROSS-REFERENCE TO RELATED APPLICATIONS

This application is the National Stage filing under 35 U.S.C. 371 of International Application No. PCT/KR2014/009694, filed on Oct. 15, 2014, which claims priority under 35 U.S.C. 119(e) to U.S. Provisional Application No. 61/982,292, filed on Apr. 21, 2014, and U.S. Provisional Application No. 62/019,853, filed on Jul. 1, 2014, the contents of which are all hereby incorporated by reference herein in their entirety.

TECHNICAL FIELD

The present invention relates to a method for transmitting data and more specifically, a method and an apparatus for transmitting HTTP data using Bluetooth, a short range wireless communication technology.

BACKGROUND ART

Bluetooth is a Radio Frequency (RF) specification proposed for transmission of point-to-multi-point voice and data over short distances.

A Bluetooth signal can penetrate solids and non-metallic materials. The typical transmission range is from 10 cm to 10 m, however, with increased transmission power, the range can be extended up to 100 m. Bluetooth technology is based on a low cost, short range wireless link and facilitates ad-hoc connections in a fixed and a mobile communication environment.

Bluetooth operates at 2.45 GHz which belongs to the same ISM band as specified for the 802.11b/g wireless LAN, and a Bluetooth device can perform wireless communication with Bluetooth devices in the surroundings thereof through a search/selection/authentication (pairing) process.

Although Bluetooth provides a relatively high data transfer speed using relatively low power at low cost, the transmission range is limited up to 100 m, and thus it is appropriate for use in a limited-scale environment.

Bluetooth started to become popular rapidly when communication quality was guaranteed to be at a predetermined level as the EDR (Enhanced Data Rate) specification was added to the Bluetooth version 2.0. As Bluetooth is widely used, Bluetooth-enabled portable devices are also becoming popular. In particular, short range data communication based on Bluetooth is widely used, an example of which is wireless music listening through Bluetooth communication with a Bluetooth headset.

Also, music play by using Bluetooth communication is becoming more common, as evidenced in the case of music play through coupling of a smartphone and car speakers via Bluetooth communication or music play through coupling a Bluetooth docking speaker and a smartphone.

Also, WPAN (Wireless Personal Area Network) can be used to transmit a small amount of data among devices in a home network, small office, or vehicular network environment, thereby maximizing energy efficiency.

Also, WPAN is widely used since it is capable of providing a real-time A/V streaming service through an electronic device such as a headset within a limited bandwidth and maximizing energy efficiency when an accompanying remote control function is performed.

DISCLOSURE

Technical Problem

An object of the present invention is to provide a method and an apparatus for transmitting HTTP data smoothly by using the Bluetooth low energy in a wireless communication system.

An object of the present invention is to provide a method and an apparatus for distinguishing devices transmitting HTTP data by using the Bluetooth low energy in a wireless communication system.

An object of the present invention is to provide a method and an apparatus for resolving an error occurred during transmission of HTTP data by using the Bluetooth low energy in a wireless communication system.

An object of the present invention is to provide a method and an apparatus for transmitting an error message for resolving an error occurred during transmission of HTTP data by using the Bluetooth low energy in a wireless communication system.

An object of the present invention is to provide a method and an apparatus for determining a data transmission method when HTTP data is transmitted by using the Bluetooth low energy in a wireless communication system.

An object of the present invention is to provide a method and an apparatus for providing information of data being transmitted when HTTP data is transmitted by using the Bluetooth low energy in a wireless communication system.

The technical problems that the present invention is attempting to solve are not limited to those described above, and other technical objects not described above can be understood clearly from the following descriptions by those skilled in the art to which the present invention belongs.

Technical Solution

To achieve the objectives above, the present invention provides a method for transmitting and receiving data to and from a web server, comprising receiving a first write request including information related to an HTTP (Hyper Text Transfer Protocol) request from a first client device; transmitting to a web server information related to an HTTP request generated on the basis of information included in the received first write request; receiving an HTTP response message in response to the information related to the HTTP request from the web server; notifying the first client device of an HTTP status code indicating the status of data included in the received HTTP response message; and receiving a read request requesting data transmission on the basis of information included in the HTTP status code from the first client device, wherein an error response is transmitted to the different client device, when a second write request is received from a different client device while the first write request is being received.

Also, the error response according to the present invention indicates that the gateway performs an operation for generating the information related to the HTTP request with the first client device or that resources are not enough since the gateway is performing an operation for generating the information related to the HTTP request.

Also, the receiving a first write request according to the present invention further comprises receiving a URI (Universal Resource Identifier) write request from the first client device; transmitting a URI write response in response to the received URI write request to the first client device; receiving an HTTP header write request from the first client device; transmitting an HTTP header write response in response to the received HTTP header write request to the first client device; receiving an HTTP entity body write request from the first client device; transmitting an HTTP entity body write response in response to the received HTTP entity body write request to the first client device; receiving an HTTP control point request commanding a specific operation related to the HTTP request message from the first client device; and transmitting an HTTP control point response in response to the received HTTP control point request to the first client device.

Also, the receiving a read request according to the present invention further comprises receiving an HTTP header read request from the first client device; transmitting an HTTP header read response in response to the HTTP header read request to the first client device; receiving an HTTP entity body read request from the first client device; and transmitting an HTTP entity body read response in response to an HTTP entity body read request to the first client device.

Also, according to the present invention, the data includes at least one of a header or an entity body received from the web server.

Also, according to the present invention, the HTTP status code includes information related to data length.

Also, according to the present invention, the HTTP status code is notified together with information related to data length.

Also, according to the present invention, the information related to data length includes 0 or 1, indicates existence of the data, when the information related to data length is 0, and indicates that the data has been transmitted up to a maximum data transmission length because the data length exceeds the maximum data transmission length, when the information related to data length is 1.

Also, according to the present invention, the information related to data length includes data length, the data is transmitted to the first client device through a read request procedure, when the data length is equal to or shorter than ATT_MTU-2 value, wherein the ATT_MTU-2 value represents the maximum data length that can be transmitted at a time through the read request procedure.

Also, according to the present invention, the information related to data length includes data length, wherein the data is transmitted to the first client device through a read blob request procedure, when the data length exceeds ATT_MTU-2 value and is equal to or shorter than the maximum ATT data length, wherein the maximum ATT data length represents the maximum data size that can be transmitted through attribute protocol.

Also, according to the present invention, the information related to data length includes data length, and wherein the data is transmitted to the first client device through L2CAP CoC (Logical Link Control and Adaptation Protocol Connection Oriented Channel), when the data length exceeds the maximum ATT data length.

Also, the present invention further comprises receiving a request message requesting a client ID value from the first client device; transmitting a response message in response to the request message; and receiving a change request message requesting changing the client ID value to first client device information from the first client device, when the client ID value is NULL.

Also, according to the present invention, the first client device information includes at least one of a user ID or ID of the first client device.

Also, the present invention further comprises notifying other client devices connected to the gateway of the changed client ID.

Also, according to the present invention, the changed client ID is changed to NULL at the request of the first client or after a predetermined time period is passed.

Also, the present invention further comprises receiving a request message requesting a protected value indicating use of other client devices from the first client device; transmitting a response message in response to the request message; and receiving a request message requesting change of the protected value from the first client device, when the protected value is No.

Also, the present invention further comprises notifying other client devices connected to the gateway of the changed protected value.

Also, according to the present invention, the changed protected value is changed to No at the request of the first client or after a predetermined time period is passed.

Also, the present invention provides a method for transmitting and receiving data comprising transmitting a read request for requesting information related to a first object to the server; receiving a read response including information related to the first object in response to the read request from the server; transmitting a message for changing the first object to a second object to the server; and receiving an error code related to the second object from the server, wherein the error code indicates that resources of the server are not sufficient.

Also, the present invention provides an apparatus comprising a communication unit for transmitting and receiving a signal to and from an external entity in a wired and/or wireless manner; and a controller functionally connected to the communication unit, wherein the controller configured to receive a first write request including information related to an HTTP (Hyper Text Transfer Protocol) request from a first client device, generate information related to the HTTP request on the basis of information included in the received first write request, transmit the generated information related to the HTTP request to a web server, receive an HTTP response message in response to the information related to the HTTP request from the web server, notify the first client device of an HTTP status code indicating the status of data included in the received HTTP response message, and receive a read request requesting data transmission on the basis of information included in the HTTP status code from the first client device, wherein an error response is transmitted to the different client device, when a second write request is received from a different client device while the first write request is being received, an error response is transmitted to the different client device.

Advantageous Effects

A method and an apparatus for transmitting HTTP data by using Bluetooth low energy according to the present invention provides advantageous effects as follows.

According to the present invention, HTTP data can be transmitted efficiently by using Bluetooth low energy.

According to the present invention, in the event of an HTTP data transmission request by a different device during data transmission based on Bluetooth low energy, an error message can be transmitted to resolve an error that can occur while a service is being provided.

According to the present invention, in case a plurality of devices are attempting to transmit HTTP data by using Bluetooth low energy, and a device is already transmitting HTTP data, existence of the device can be notified to transmit HTTP data efficiently.

According to the present invention, in case HTTP data are transmitted by using Bluetooth low energy, user convenience can be improved by defining additional message types about a client ID, whether to use a different client, data length, and so on.

BRIEF DESCRIPTION OF THE DRAWINGS

FIG. 1 illustrates one example of transmitting HTTP data by using Bluetooth low energy.

FIG. 2 illustrates one example of an internal block diagram of a server device and a client device according to the present invention.

FIG. 3 illustrates a functional organization of an internal structure of a device to which the present invention is applied.

FIG. 4 illustrates a functional structure for transmitting HTTP data by using Bluetooth low energy, to which the present invention is applied.

FIG. 5 illustrates one example of transmitting HTTP data by using Bluetooth low energy.

FIGS. 6 and 7 illustrate one example in which a plurality of client devices transmit write requests to the same gateway.

FIG. 8 illustrates one example of transmitting an error response when a plurality of devices transmit write requests, to which the present invention is applied.

FIG. 9 illustrates one example of transmitting an error response according to data length, to which the present invention is applied.

FIG. 10 illustrates one example of transmitting HTTP data by using a currently used client ID, to which the present invention is applied.

FIG. 11 illustrates one example of transmitting a currently used client ID to a plurality of devices, to which the present invention is applied.

FIG. 12 illustrates one example of notifying of existence of a device already transmitting HTTP data in case devices are transmitting HTTP data, to which the present invention is applied.

FIG. 13 illustrates another example of notifying of existence of a device already transmitting HTTP data to a plurality of devices, to which the present invention is applied.

FIG. 14 illustrates one example of activating/deactivating a security function, to which the present invention is applied.

FIG. 15 illustrates one example of changing transmission methods according to data size, to which the present invention is applied.

FIG. 16 illustrates one example of a method for transmitting Bluetooth data, to which the present invention is applied.

FIGS. 17 and 18 illustrate an example of a method for notifying of data length at the time of transmitting HTTP data, to which the present invention is applied.

FIG. 19 is a flow diagram illustrating one example of transmitting an error code of an object transfer service, to which the present invention is applied.

MODE FOR INVENTION

The technical object, characteristics, and advantages of the present invention will now be more clearly understood from detailed descriptions given below with reference to appended drawings. It should be noted that the present invention can be modified in various ways, and various embodiments can be implemented according to the present invention; therefore, in what follows, specific embodiments will be illustrated in the appended drawings and described in detail. Throughout the document, the same reference number represents the same component. In the following description, if it is decided that the detailed description of a known function or configuration related to the invention obscures the technical principles of the present invention, the corresponding description is omitted.

In what follows, a method and an apparatus according to the present invention will be described in more detail with reference to appended drawings. A suffix such as "module" and "unit" may be assigned or used interchangeably to refer to elements or components. Use of such a suffix herein is merely intended to facilitate description of the specification, and the suffix itself is not intended to give any special meaning or function.

Electronic devices in this document may include a cellular phone, a smart phone, a laptop computer, a digital broadcasting terminal, personal digital assistants (PDA), a portable multimedia player (PMP), and a navigation terminal; however, it should be clearly understood by those skilled in the art that except for those specific cases applicable only to a mobile terminal, the structure according to the embodiments according to the present invention can also be applied to fixed terminals such as a digital TV and a desktop computer.

A signal described in this document can be transmitted in the form of not only a message but also a frame.

FIG. 1 illustrates one example of transmitting HTTP data by using Bluetooth low energy.

With reference to FIG. 1, an apparatus supporting Bluetooth is connected to the Internet through a Bluetooth-enabled gateway.

Bluetooth is one of typical short range wireless technologies used for connecting various devices (such as smartphones, PCs, earphones, and headphones) and exchanging information among them. The Bluetooth low energy requires small power and is capable of providing hundreds of kilobytes of information reliably. The Bluetooth low energy employs Attribute Protocol to exchange information among devices.

The operating scheme reduces overhead of a header and simplifies operation, thereby reducing energy consumption.

Bluetooth low energy can also be used for exchanging data by connecting devices to the Internet. This is possible since a device utilizing Bluetooth can use and provide the information on the Internet, thereby enabling a user to utilize desired information anytime and anywhere.

However, in order to use the aforementioned function, a gateway capable of accessing a web service has to connect the device to the Internet.

FIG. 1 depicts a situation in which a client device 10 supporting Bluetooth low energy (in what follows, it is denoted as Bluetooth LE) and the gateway 20 is connected to each other through Bluetooth.

Through the connection, the client device 100 can transmit data to the gateway 200. The gateway 200 is connected to a web server 400 by using a technology such as Wi-Fi or LTE (Long Term Evolution) through which data received from the client device 100 can be transmitted to the web server.

The present invention provides a method and an apparatus for transmitting data efficiently in case Bluetooth is employed for transmission of HTTP data.

FIG. 2 illustrates one example of an internal block diagram of a server device and a client device according to the present invention.

Gateway 200 can refer to all kinds of electronic devices capable of directly communicating with a client device 100. In this document, the gateway 200 can be called a server device.

The client device 100 can refer to all kinds of electronic devices supporting Bluetooth functions.

The gateway 200 can receive data by directly communicating with the client device 100 and inform the client device 100 of a processing result of the received data.

Also, the gateway 200 can receive a request for data from the client device 100, transmit the requested data to the client device 100, send a notification or indication message to the client device 100 to this purpose, and receive a confirm message with respect to the notification or indication message.

One server device can be connected to multiple client devices and can be reconnected easily to client devices by using bonding information.

The client device 100 and the gateway 200 can comprise a communication unit 110, 210, user input unit 120, 220, output unit 130, 230, controller 140, 240, memory 150, 250, and power supply 160, 260, respectively.

The communication unit, user input unit, controller, memory, and power supply are connected functionally to each other to perform the method proposed by the present invention.

The constituting elements shown in FIG. 2 are not mandatory as they are, but an electronic device can be implemented by using a larger or smaller number of constituting elements than are shown in FIG. 2.

The communication unit 160, 260 can include one or more modules which enable wireless communication between a device and a wireless communication system or between a device and a network to which the device belongs. For example, the wireless communication unit 160, 260 can include a broadcasting reception module (not shown), a mobile communication module (not shown), a wireless Internet module (not shown), and a short range communication module (not shown).

The wireless communication unit 160, 260 can be called a transmission/reception unit.

The mobile communication module transmits and receives a radio signal to and from at least one of a base station, external terminal, or server on a mobile communication network. The radio signal can include various types of data according to a voice call signal, video call signal, or transmission and reception of a text/multimedia message.

The wireless Internet module refers to a module for wireless Internet connection, which can be installed inside or outside a device. WLAN (Wireless LAN) (WiFi), Wibro (Wireless broadband), Wimax (World Interoperability for Microwave Access), or HSDPA (High Speed Downlink Packet Access) can be used as the wireless Internet technology.

Through the wireless Internet module, the device can establish a WI-Fi P2P (Peer-to-Peer) connection with other devices. Through the Wi-FI P2P connection, a streaming service can be performed between devices, data transmission/reception can be performed, or a printing service can be provided by being connected to a printer.

In this document, the gateway 200 can be connected to a client device 100 through a short range communication module and can receive data or a data request from the client device 100 through the short range communication module.

Also, the gateway 200 can connect to the Internet through the wireless Internet module by being connected to a web server; through the wireless Internet module, the gateway 200 can transmit data received from the client device 200 to a web server or receive data requested from the client device 100.

A user generates input data for controlling operation of a terminal through the user interface unit 120, 220. The user interface unit 120, 220 can be implemented by a key pad, dome switch, (capacitive/constant pressure-type) touch pad, jog wheel, jog switch, and so on.

The output unit 130, 230 generates an output related to visual, aural, tactile sensing, which includes a display module 132, 232 and a sound output module 134, 234.

The display module 132, 232 displays information processed in the device. For example, in case the device is in a communication mode, the display module displays a User Interface (UI) or a Graphic User Interface (GUI) related to communication. In case the device is in a visual communication mode or in an image capture mode, the display module displays a captured and/or received image or UI or GUI.

The display module 132, 232 can be implemented by using at least one of liquid crystal display, thin film transistor liquid crystal display, organic light emitting diode, flexible display, and 3D display.

The sound output module 134, 234 can output audio data received from the wireless communication unit 110, 210 in a call signal reception mode, communication mode, recording mode, voice recognition mode, or broadcasting reception mode; or audio data stored in the memory 150, 250. The sound output module 134, 234 outputs a sound signal related to the function carried out in the device (for example, call signal reception sound and a message reception sound). The sound output module 134, 234 can be implemented by a receiver, a speaker, or a buzzer.

The controller 140, 240 refers to a module for controlling the overall operation of the client device 100 or the gateway 200; and can control the source or the sink device to request message transmission or to process a received message through Bluetooth interface and other communication interfaces.

The controller 140, 240 can also be called a microcontroller or a microprocessor, and can be implemented by hardware, firmware, software, or a combination thereof.

The controller 140, 240 can include Application-Specific Integrated Circuit (ASIC), other chipsets, logic circuit, and/or data processing apparatus.

The memory 150, 250 stores various kinds of information about a terminal and by being connected to the controller is capable of storing programs for operation of the controller 160, 260, applications, ordinary files, and input/output data.

The memory 130, 230 can be implemented by using at least one type of storage media: flash memory type, hard disk type, multimedia card micro type, card type (for example, SD and XD memory), Random Access Memory (RAM), Static Random Access Memory (SRAM), Read Only Memory (ROM), Electrically Erasable Programmable Read Only Memory (EEPROM), Programmable Read Only Memory (PROM), magnetic memory, magnetic disk, and optical disk. The device can be operated by using web storage on the Internet, which performs a storage function of the memory 130, 230.

The power supply unit 160, 260 refers to the module which receives external and internal power under the control of the controller 140, 240 and supplies power required to operate individual constituting elements.

The Bluetooth LE technology employed for the present invention exhibits a small duty cycle and is capable of reducing power consumption significantly through a low data transmission rate; thus, the power supply 160, 260 can provide power required for operating individual constituting elements even with small output power (which is less than 100 mW (10 dBm)).

FIG. 3 illustrates a functional organization of an internal structure of a device to which the present invention is applied.

A client device and a server device comprise a host 320 and a controller 310, respectively, where the controller 310 further comprises a physical layer (PHY) 312 and a link layer (LL) 314.

The host 320 again further comprises a L2CAP (Logical Link Control and Adaptation Protocol) 331, security manager (SM) 332, attribute protocol (ATT) 333, generic attribute profile (GATT) 334, generic access profile (GAP) 335, and GATT-based profile 336.

The controller 310 and the host 320 are connected to each other through a host controller interface (HCI) 316.

The host 320 can provide commands and data to the controller 310 through the HCI 316, and the controller can provide events and data to the host 320 through the HCI 316.

The controller 310 refers to hardware transmitting or receiving Bluetooth packets to and from a wireless transmission and reception module which receives Bluetooth signals.

The PHY layer 312 is intended for transmitting and receiving a radio signal, employing GFSK (Gaussian Frequency Shift Keying) modulation and a frequency hopping scheme utilizing 40 RF channels.

The link layer 314 can perform an advertising and scanning function by using 3 advertising channels to establish a connection between devices and provide a function of transmitting and receiving data packets through 37 data channels.

By using the logical link control and adaptive protocol (in what follow, it is called L2CAP, 311), the host 320 can perform multiplexing of various protocols provided by upper Bluetooth layers.

The L2CAP 331 may provide a single bi-directional channel for sending data to a specific protocol or profile and uses three fixed channels in the Bluetooth LE method.

The three fixed channels may be used for a signaling channel, the security manager 332, and the ATT protocol (hereinafter referred to as "ATT") 333, respectively.

In a Bluetooth Basic Rate/Enhanced Data Rate (BR/EDR), a dynamic channel is used, and a protocol service multiplexer, retransmission, and streaming mode may be supported.

The security manager (hereinafter referred to as "SM") 332 is a protocol for providing device pairing and a key distribution.

The ATT 333 is used for communication between a server and a client and has an attribute handle that enables a client to access attributes included in a server. Protocol operation commands include "Request", "Response", "Command", "Notification", "Indication", and "Confirm."

Request and Response messages: a Request message is a message for allowing a client device to request specific information from a server device. A Response message is a response message for a Request message and refers to a message transmitted from a server device to a client device.

Command message: a Command message is a message transmitted from a client device to a server device in order to indicate a command of a specific operation. A server device does not send a response to a Command message to a client device.

Notification message: a Notification message is a message transmitted from a server device to a client device for a notification, such as an event. A client device does not send a Confirm message for a Notification message to a server device.

Indication and Confirm messages: Indication and Confirm messages are messages transmitted from a server device to a client device for a notification, such as an event. Unlike in a Notification message, a client device sends a Confirm message for an Indication message to a server device.

The GATT profile (hereinafter referred to as "GATT") 334 is a layer newly implemented for a Bluetooth LE technology, and it defines a procedure for obtaining corresponding information using the S/W elements of a Bluetooth device below and messages defined in the ATT protocol. The procedure may define the configuration of discovering, reading, writing, notifying, and indicating characteristics.

Service: define the basic operation of a device through a combination of behaviors related to data.

Include: define the relationship between services.

Characteristics: data values used in a service.

Behavior: a computer-readable format defined as a Universally Unique Identifier (UUID).

The GAP 335 defines a scheme for discovering and connecting defined devices and providing information to a user and may provide privacy.

The GATT-based profile 336 refers to the profiles bearing dependency on the GATT 334 and is applied mainly for low energy devices.

The GATT-based profile 366 can include profiles related to battery, time, proximity, phone alert, heart rate, and HTTP proxy service 337.

The HTTP proxy service 337 can perform a function of requesting delivery of an HTTP message by utilizing the GATT (Generic Attribute Profile) function of the Bluetooth. By using the HTTP proxy service 337, the client device 100 and the host device 200 can transmit an HTTP message delivery request and data transmitted from a web server to the client device 100.

FIG. 4 illustrates a functional structure for transmitting HTTP data by using Bluetooth low energy, to which the present invention is applied.

With reference to FIG. 4, a gateway 200 receiving data from a client device 100 through Bluetooth can transmit the received data to an Internet web server 400.

Among internal components comprising the client device 100 and the gateway 200, those found repeatedly in the structure of FIG. 3 will not be described again.

To describe the aforementioned operation more specifically, the client device 100 includes an HTTP proxy client 12. At this time, the client device 100 and the gateway 200 can support Bluetooth low energy.

The HTTP proxy client 12 can provide a function for using the HTTP proxy server 22 of the gateway 200 since the client device 100 is unable to connect to a web server through the Internet by using the Bluetooth technology.

The client device 100 can be connected to the gateway 200 through the HTTP proxy client 12, through which a message requesting data to be transmitted to a web server or data can be transmitted to the gateway 200.

The gateway 200 includes an HTTP proxy server 22 and an HTTP client 24. The HTTP proxy server 22 provides an HTTP proxy service function for connecting the client device 100 and the HTTP server 400.

The HTTP client 24 performs a client function for sending and receiving an HTTP request to and from an HTTP server to provide the HTTP proxy function of the client device 100, which generates an HTTP message by using the data of the HTTP proxy service and performs communication with the HTTP server.

The gateway 200 can receive a message or data to be transmitted to a web server from the client device 100 through the HTTP proxy server 22 and generate an HTTP message through the received data.

After the HTTP message is generated, the gateway 200 can transmit the generated HTTP message to the HTTP server 400 through wireless communication via the HTTP client 24.

At this time, the wireless communication refers to any communication means capable of connecting a device to an Internet server, excluding Bluetooth. For example, Wi-Fi or LTE can be used for wireless communication.

The HTTP server refers to a server which uses the HTTP protocol for providing a web service.

Also, the gateway can receive data requested by the client device 100 from the HTTP server 400 through the HTTP client 24.

The received data is converted again into the form that can be transmitted through Bluetooth communication and transmitted to the HTTP proxy client 12 of the client device 100 through the HTTP proxy server 220.

FIG. 5 illustrates one example of transmitting HTTP data by using Bluetooth low energy.

HTTP Proxy Service Characteristic Requirements

Characteristics of an HTTP proxy service are summarized in Table 1 below.

TABLE 1

| Characteristics Name | Requirement | Mandatory Properties | Optional Properties | Security Permissions |
| --- | --- | --- | --- | --- |
| URI | M | Read, Write | | Optional |
| HTTP Headers | M | Read, Write | | Optional |
| HTTP Status Code | M | Notify, Indicate | | Optional |
| HTTP Entity Body | M | Read, Write | | Optional |
| HTTP L2CAP PSM | M | Read | | Optional |
| HTTP Control Point | M | Write, Indicate | | Optional |
| HTTPS Security | M | Read | | Optional |

Characteristics of the HTTP proxy service include information for providing an HTTP proxy service.

The URI characteristic is used for configuring an URI for subsequent requests. The URI characteristic includes an URI used for an HTTP request and can use up to the maximum length allowed. For example, the current maximum length allowed for an HTTP request which includes an URI is 512 octets.

The HTTP header characteristic is used for including a header included in a write request or a read request.

The HTTP header characteristic can be used up to the maximum length allowed. For example, the current maximum length of the HTTP header characteristic is 512 octets.

The HTTP entity body includes a body of a message to be transmitted. The HTTP L2CAP PSM (HTTP L2CAP Protocol Service Multiplexer) is an identifier indicating which protocol or which service is related to data information.

In case the HTTP L2CAP PSM value is changed, the gateway can indicate the change or notify a client device of the changed value.

The HTTP status code characteristic can include information indicating status of received data. The status of the received data refers to the status of the data belonging to the HTTP header and/or HTTP entity body received by the gateway 200 from the web server 400.

The HTTP control point performs a function of commanding the HTTP proxy service to perform a specific operation. The table 2 below shows commands that can belong to the HTTP control point.

TABLE 2

| Op Code Value | Procedure |
| --- | --- |
| 0x00 | Reserved for Future Use |
| 0x01 | HTTP GET Request |
| 0x02 | HTTP HEAD Request |
| 0x03 | HTTP POST Request |
| 0x04 | HTTP PUT Request |
| 0x05 | HTTP DELETE Request |
| 0x06 | HTTPS GET Request |
| 0x07 | HTTPS HEAD Request |
| 0x08 | HTTPS POST Request |
| 0x09 | HTTPS PUT Request |
| 0x0a | HTTPS DELETE Request |
| 0x0b | HTTPS Request Cancel |
| 0x0c – 0xff | Reserved for Future Use |

The HTTPS security includes information indicating whether to use a security-related function. In case the HTTPS security function is Yes, a security function is performed by using HTTPS while, in case it is No, HTTP is employed, and a security function may not be performed.

The HTTP security characteristic can be expressed by Boolean logic.

Write Request

With reference to FIG. 5, the client device 1 100 can transmit information required for generating an HTTP request message to the gateway 200 through a write request. The write request can include one characteristic.

The client device 1 100 transmits a URI (Universal Resource Identifier) through a write request S510. Afterwards, the client device 100 transmits an HTTP header again through a write request S512 and transmits an HTTP entity body and HTTP control point sequentially through write requests S514, S516.

The gateway 200 can transmit response messages with respect to the individual write requests to the client device 1100.

In other words, the gateway 200 can transmit a response to a write request including the URI, a response to a write request including the HTTP header, a response to a write request including the HTTP entity body, and a response to a write request including the HTTP control point to the client device 1100, respectively.

The gateway 200 can generate an HTTP request message on the basis of the information received from the client device 1 100 and transmit the generated message to the web server 400, S518.

The HTTP request message can include HTTP request-related information, namely information (URI, HTTP header, and HTTP entity body) transmitted from the client device 1100.

In other words, the client device 1 100 can transmit an HTTP request-related information to the gateway 200, and the gateway 200 can transmit the HTTP request-related information to the web server 400 in the form of one message or frame.

The web server 400 which has received the HTTP request message transmits an HTTP response message including requested data and HTTP status code to the gateway in response to the HTTP request message S518. The HTTP status code indicates the status of the requested data.

The gateway 200 which has received the HTTP response message converts the HTTP response message into the form that can be transmitted through Bluetooth and transmits the converted HTTP response message to the client device 100.

Read Request

The gateway transmits an indication message which includes a status code to the client device 100, S522. Through this operation, the client device can know whether the gateway 200 has received requested data correctly, has failed to receive the requested data, or has received the requested data incompletely.

The client device 100 can request the gateway 200 to send the information that the gateway has received from the web server 400 through a read request.

In other words, the client device 100 can receive a URI by transmitting a read request to the gateway 200 S522 and can receive an HTTP header again through a read request S526. Afterwards, the client device 100 can transmit a read request to the gateway 200 to receive an HTTP entity body and receive an HTTP entity body from the gateway 200, S528.

Through this operation, the client device 1 100 can transmit and receive data to and from the web server 400.

However, a plurality of client devices can connect to the gateway 200 simultaneously. In this case, it is impossible to know which device uses the corresponding service; therefore, a service may not be provided smoothly.

In what follows, described will be the aforementioned problem.

FIGS. 6 and 7 illustrate one example in which a plurality of client devices transmit write requests to the same gateway.

Since the S710 to S718 steps of FIG. 7 are the same as the S510 to S518 steps of FIG. 5, the corresponding descriptions will be omitted.

Referring to FIGS. 6 and 7, Bluetooth-enabled devices 100, 120, 140 are transmitting a write request including HTTP request-related information to the gateway 200 for HTTP data transmission.

The gateway 200, being connected to a client device, can deliver an HTTP message including the HTTP request-related information that the client device has requested to the web server 300. However, if the gateway 200 again receives a write request for generating an HTTP message from different client devices 120, 140 while the client device 100 is delivering a write request for generating an HTTP message to the gateway 200, existing characteristics cannot be maintained.

In other words, as shown in FIG. 7, if a write request is received from the client device 2 120 while the client device 1 100 is transmitting information to the gateway 200 through a write request, the information about characteristic that the client device 1 100 has transmitted before to the gateway 200 cannot be maintained.

Therefore, the client 1 may fail to receive the data that it has requested, and smooth transmission of data may not be attained.

To solve the aforementioned problem, in case there already exists a device transmitting information to the gateway 200 through a write request, or in case another device again issues a write request, an error message can be transmitted or existence of a client device already using the corresponding service can be notified.

In what follow, the method above will be described in more detail.

Transmission of an Error Message in Response to a Request

FIG. 8 illustrates one example of transmitting an error response when a plurality of devices transmit write requests, to which the present invention is applied.

Since the S810 to S816 steps of FIG. 8 are the same as the S510 to S516 steps of FIG. 5, the corresponding descriptions are omitted.

While the client device 1 100 is transmitting data to the gateway 200 through a write request, the client device 2 120 can transmit URI information through a write request to generate an HTTP request message S818.

However, since the client device 1 100 is already making a write request on the gateway 200, the gateway 200 cannot accept the write request of the client device 2 200.

The gateway 200 can decline the request of the client device 2 120 because a write request is already being dealt with, or resources of the gateway are not enough to handle another write request.

Therefore, since the gateway 200 is not able to accept a write request of the client device 2 120, an error response is transmitted to the client device 2 120, S820.

Table 3 below shows error codes that can be included in the error response to a write request of a client device.

TABLE 3

| Name | Error Code | Description |
| --- | --- | --- |
| Other Client is using | 0x80 | Can not write a value because of Server is servicing to other client |
| Long HTTP Entity Body | 0x81 | L2CAP delivery is needed because of HTTP Entity Body is Long |

Among the error codes, the gateway 200 can include 0x80 in the error response and transmit the error response to the client 2 120; in case the client 2 receives the error response message, it can stop issuing a write request.

Although not shown in the figure, like the S518 step of FIG. 5, the gateway 200 can transmit HTTP request-related information received from the client device 1 100 to a web server and receive an HTTP response including HTTP data from the web server as in the S518 step.

The HTTP response can include a status code indicating the status of the HTTP data.

In what follows, since the S822 to S828 steps are the same as the S522 to S528 steps of FIG. 5, the corresponding descriptions are omitted.

In addition to the HTTP proxy service of the present invention, the error codes of Table 3 can be used for a different service of Bluetooth, for example, Bluetooth object transfer service, and specific descriptions thereof will be given with reference to FIG. 19.

FIG. 9 illustrates one example of transmitting an error response according to data length, to which the present invention is applied.

With reference to FIG. 9, in case length of the data that the gateway 200 attempts to transmit to the client device 1 100 is long, an error message is transmitted, and data are transmitted through a different method.

Since the S910 to S916 steps are the same as the S510 to S516 steps of FIG. 5, the corresponding descriptions are omitted.

Although not shown in the figure, like the S518 step of FIG. 5, the gateway 200 can transmit HTTP request-related information received from the client device 1 100 to a web server and receive an HTTP response including HTTP data from the web server as in the S518 step.

Since the S918 to S922 steps are the same as the S522 to S526 steps of FIG. 5, the corresponding descriptions are omitted.

The HTTP response can include a status code indicating the status of the HTTP data.

The client device 1 100 transmits a read request to the gateway 200 to read an HTTP entity body from the gateway 200, S924.

However, in case the length of an HTTP entity body transmitted from a web server is too long to be transmitted via an ATT protocol message, data have to be received through a different channel.

Therefore, the gateway transmits an error response to the client device 1 100 S926. The error response can include 0x81 code of Table 3.

The client device 1 100 which has received the error response can receive the HTTP entity body by opening an L2CAP connection oriented channel instead of using the ATT protocol S928.

By using the scheme described above, even if the length of received data is long, the received data can be transmitted by opening a different channel through an error message.

Transmission of Client ID

FIG. 10 illustrates one example of transmitting HTTP data by using a currently used client ID, to which the present invention is applied.

Table 4 below shows another example of characteristics.

TABLE 4

| Characteristic Name | Require-ment | Mandatory Properties | Optional Properties | Security Permissions |
| --- | --- | --- | --- | --- |
| Client ID | | Read, Write, Indication/Notification | | |
| Protected | | Read, Write, Indication/Notification | | |
| URI | M | Read, Write | | Optional |
| HTTP Headers | M | Read, Write | | Optional |
| HTTP Status Code | M | Notify, Indicate | | Optional |
| HTTP Entity Body | M | Read, Write | | Optional |
| HTTP L2CAP PSM | M | Read | | Optional |
| HTTP Control Point | M | Write, Indicate | | Optional |
| HTTPS Security | M | Read | | Optional |

The client ID characteristic includes the ID of a client that wants to use the HTTP proxy function. If the client ID value is null, the HTTP proxy service (HPS) can be used, but if the client ID assumes a particular value, the HTTP proxy service (HPS) cannot be requested.

The client ID can be used to distinguish a user or a device by employing a user ID or a device ID and can be used to distinguish a user or a service within a device by adding a service UUID.

The protected characteristic can be used to set a specific function to yes if a request is received from a client device, and in case the function is set to yes, other clients are not allowed to issue a request.

Once a response is completed, the protected function can be turned into No state, and only for this case, other clients can issue a request.

Also, the protected function may be turned into the No state when a predetermined time period is passed after the HTTP status code is indicated.

With reference to FIG. 10, a client device can read a client ID value from the gateway, and in case the client ID value is the same as that of another client device, the client device is unable to use the HTTP proxy service.

To describe the scheme specifically, the client device 1 100 transmits a read request for a client ID to the gateway S1010. In case there already exists a client device using the HTTP proxy service, the gateway 200 can transmit information of the client device to the client device 1 100 in response to the read request.

However, in case no client device is using the HTTP proxy service, the gateway 200 transmits a read response including the null value to the client device 1100, S1012.

The client device 1 100 which has checked that no client device is using the HTTP proxy service can request the gateway 200 to write the information of the client device 1 100 into the client ID value through a write request S1014.

The gateway 200 which has received the request can enter the information of the client device 1 100 into the client ID and transmit a response message to the client device 1 100 in response to the request.

In what follows, since the S1016 to S1022 steps are the same as the S510 to S516 steps of FIG. 5, the corresponding descriptions are omitted.

Next, the client device 2 120 can request a client ID value through a read request to use the HTTP proxy service S1024.

A gateway 200 transmits read response to the client device 2 120 in response to the read request of the client device 2 120, S1026.

Since the client device 1 100 is already using the HTTP proxy service, the gateway 200 can transmit the client ID value by including the information about the client device 1 100 therein, for example, user ID or device ID.

From a read response including the client ID of the gateway 200, it can be known that the client device 1 100 is using the HTTP proxy service.

Therefore, the client device 2 120 stops an HTTP proxy service request until the client ID value becomes null.

Although not shown in the figure, like the S518 step of FIG. 5, the gateway 200 can transmit the HTTP request-related information received from the client device 1 100 to the web server and can receive an HTTP response including HTTP data from the web server as in the S518 step.

The HTTP response can include a status code indicating the status of the HTTP data.

In what follows, since the S1028 to S1034 steps are the same as the S522 to S528 steps of FIG. 5, the corresponding descriptions are omitted.

According to the method described above, in case there already exists a device using the HTTP proxy service, by not using the HTTP proxy service, an existing characteristic of the gateway is not removed, and since a device currently using the HTTP proxy service can be known, the HTTP proxy service can be provided smoothly.

FIG. 11 illustrates one example of transmitting a currently used client ID to a plurality of devices, to which the present invention is applied.

With reference to FIG. 11, in case a client ID is changed, connection to the HTTP proxy service can be performed easily by notifying the clients connected to the gateway 200 of the change.

To describe the aforementioned operation specifically, in case the client ID value is null, the client device 1 100 can request the gateway 200 to write information of the client device 1 100 into the client ID value through a write request S1110.

According to the request, the gateway 200 can write the information of the client device 1100, for example, a user ID or a device ID of the client device 1 100 into the client ID value and can transmit a response to the request to the client device 1100.

Afterwards, the gateway 200 can inform the devices connected to the gateway 200 through notification or indication that the client ID value has been changed S1112.

In case the gateway 200 informs of change of the client ID value through indication, devices receiving the indication transmit a confirm message to the gateway 200.

In what follows, since the S1114 to S1120 steps are the same as the S510 to S516 steps of FIG. 5, the corresponding descriptions are omitted.

Although not shown in the figure, like the S518 step of FIG. 5, the gateway 200 can transmit HTTP request-related information received from the client device 1 100 to a web server and receive an HTTP response including HTTP data from the web server as in the S518 step.

The HTTP response can include a status code indicating the status of the HTTP data.

Since the S1122 to S1228 steps are the same as the S522 to S528 steps of FIG. 5, the corresponding descriptions are omitted.

Since use of the HTTP proxy service has been terminated, the client device 1 100 which has received all of the requested data from the gateway 200 can request the gateway 200 to change the client ID value again to null through a write request S1130.

The gateway 200 can change the value of the client ID to null according to the request of the client device 1 100 and can inform the devices connected to the gateway 200 of the changed value through notification or indication.

At this time, in case the changed client ID value is informed through indication, the connected devices can transmit a confirm message to the gateway 200.

Also, in case the client ID is null, a plurality of client devices can request the HTTP proxy service, but if requests are issued simultaneously, data can be corrupted, and requests have to be transmitted again.

Through the method described in FIG. 11, it can be known which client device is using the HTTP proxy service, and whether the HTTP proxy service is available can be checked through notification or indication even when use of the HTTP proxy service is terminated.

Also, since congestion of data transmission due to simultaneous requests for a service, or loss of characteristics already transmitted can be prevented, services can be provided smoothly.

FIG. 12 illustrates one example of notifying of existence of a device already transmitting HTTP data in case devices are transmitting HTTP data, to which the present invention is applied.

With reference to FIG. 12, in case a client device is using the HTTP proxy service, this can be informed to other client devices so that requests for using the HTTP proxy service by the other client devices can be prevented.

To describe the aforementioned operation specifically, the client device 100 can request a protected value through a read request from the gateway 200, S1210.

The gateway 200 can transmit a read response by including a Yes value in the read response in case the HTTP proxy service is being provided to a different client device or by including a No value in the read response in case the HTTP proxy service is not being provided.

In case the protected value transmitted from the gateway 200 is Yes, it indicates that a different client device is using the HTTP proxy service; therefore, the client device cannot use the HTTP proxy service.

On the other hand, in case the protected value is No, it indicates that no client device is using the HTTP proxy service; therefore, the client device 1 100 can use the HTTP proxy service.

In what follows, since the S1214 to S1220 steps are the same as the S510 to S516 steps of FIG. 5, the corresponding descriptions are omitted.

However, in case there is a write request from a different client device while the S1214 to S1220 steps are being performed, the protected value can be changed to Yes.

Afterwards, the client device 2 120 can request a protected value from the gateway 200 through a read request to use the HTTP proxy service S1222.

However, since the client device 1 100 is already using the HTTP proxy service, the gateway transmits a Yes value to the client device 2 120 as the protected value S1224.

The client device 2 120 which has received the Yes value as a protected value from the gateway 200 can know that the HTTP proxy service is being used.

However, since only the Yes value has been received as the protected value, it is not possible to know that the device using the HTTP proxy service is the client device 1100.

Knowing that the HTTP proxy service is unavailable, the client device 2 120 cannot issue a request to the gateway 200 to use the HTTP proxy service.

Although not shown in the figure, like the S518 step of FIG. 5, the gateway 200 can transmit HTTP request-related information received from the client device 1 100 to a web server and receive an HTTP response including HTTP data from the web server as in the S518 step.

The HTTP response can include a status code indicating the status of the HTTP data.

In what follows, since the S1226 to S1232 steps are the same as the S522 to S528 steps of FIG. 5, the corresponding descriptions are omitted.

The protected value can be changed to No when the gateway 200 performs no operation in conjunction with the client device 1 100 for more than a predetermined time period or can be changed to No by the client device 1 100 through a write request for the corresponding protected value.

FIG. 13 illustrates another example of notifying of existence of a device already transmitting HTTP data to a plurality of devices, to which the present invention is applied.

With reference to FIG. 13, in case the protected value is No, the client device 1 100 can request the gateway 200 to change the protected value to Yes through a write request S1310.

The gateway 200 which has received the write request can change the protected value to Yes and transmit a response message with respect to the write request to the client device 1100.

Afterwards, the gateway 200 can inform a different connected client device, for example, client device 2 120, of the changed protected value through notification or indication S1312.

At this time, in case the client device 2 120 receives a protected value from the gateway 200 through indication, the client device 2 120 can transmit a confirm message with respect to the reception to the gateway 200.

In what follows, since the S1314 to S1320 steps are the same as the S510 to S516 steps of FIG. 5, the corresponding descriptions are omitted.

Although not shown in the figure, like the S518 step of FIG. 5, the gateway 200 can transmit HTTP request-related information received from the client device 1 100 to a web server and receive an HTTP response including HTTP data from the web server as in the S518 step.

The HTTP response can include a status code indicating the status of the HTTP data.

In what follows, since the S1322 to S1328 steps are the same as the S522 to S528 steps of FIG. 5, the corresponding descriptions are omitted.

In case the HTTP proxy service is no longer used, the client device 1 100 which has received requested data from the gateway 200 can request the gateway 200 to change the protected value to No through a write request S1330.

The gateway 200 which has received a request for change of the protected value can change the protected value to No and transmit a response to the request to the client device 1100.

The protected value can be changed when the client device 1 100 perform no operation for more than a predetermined time period in addition to the request of the client device 1100.

In case the protected value has been changed (from Yes to No), the gateway 200 can inform other connected client devices of the change through notification or indication S1332.

In case the protected value is No, a plurality of client devices can request the HTTP proxy service, but if requests are issued simultaneously, data can be corrupted, and requests have to be transmitted again.

Through the method described in FIGS. 12 and 13, whether a client device is using the HTTP proxy service can be known beforehand.

Therefore, the problem that can be occurred as different client devices request the HTTP proxy service, for example, a failure of maintaining an already transmitted characteristic, a delay caused as a unnecessary procedure or operation is performed, or delivery of uncertain information can be resolved.

Also, by solving the problem, the HTTP proxy service can be provided in a smooth and efficient manner.

FIG. 14 illustrates one example of activating/deactivating a security function, to which the present invention is applied.

With reference to FIG. 14, a client device can directly request changing the HTTPS security characteristic value through a write request.

Table 5 shows another example of characteristics of an HTTP proxy service different from those shown in Table 1.

TABLE 5

| Characteristics Name | Requirement | Mandatory Properties | Optional Properties | Security Permissions |
|---|---|---|---|---|
| URI | M | Read, Write | | Optional |
| HTTP Headers | M | Read, Write | | Optional |
| HTTP Status Code | M | Notify, Indicate | | Optional |
| HTTP Entity Body | M | Read, Write | | Optional |
| HTTP L2CAP PSM | M | Read | | Optional |
| HTTP Control Point | M | Write, Indicate | | Optional |
| HTTPS Security | M | Read, Write | | Optional |

Table 5 shows that HTTPS security is able to write as well as read a request as shown in Table 1.

Table 5 indicates that the gateway can notify of change of the HTTPS security value but also that a client device can directly request the gateway to change the HTTPS security value.

To describe more specifically with reference to FIG. 14, the client device 1 100 can request the gateway 100 to change the HTTPS security value to Yes through a write request S1410.

The gateway 200 which has received the write request can change the HTTPS security value to Yes and transit a response message to the request to the client device 1100.

In what follows, since the S1412 to S1416 steps are the same as the S510 to S514 steps of FIG. 5, the corresponding descriptions are omitted.

The client device 1 100 can request the gateway 200 to transmit an HTTPS PUT request message through the HTTPS control point characteristic S1418, and the gateway 200 can transmit a response to the request to the client device 1 100.

According to the request of the client device 1100, the gateway 200 can transmit the HTTPS PUT request message to the web server 400, S1420. The HTTPS PUT request message can include HTTP request-related information, namely information received from the client device 1 100 (URI, HTTP header, and HTTP entity body).

The web server 400 can receive an HTTPS PUT response in response to the HTTPS PUT request message S1422. The HTTPS PUT response message can include the HTTP data that the client device 1 100 has requested and/or a status code indicating the status of the HTTP data.

In order for the client device 1 100 not to use again the HTTPS security function, it is sufficient to change the HTTPS security characteristic value to No.

In other words, the client device 1 100 can request the gateway 200 to change the HTTPS security characteristic value to No through a write request S1424.

The gateway 200 which has received the write request can transmit a response message to the request to the client device 1 100.

In what follows, since the S1426 to S1430 steps are the same as the S510 to S514 steps of FIG. 5, the corresponding descriptions are omitted.

Afterwards, the client device 1 100 can request the gateway 200 to transmit an HTTPS PUT request message through the HTTPS control point characteristic S1432, and the gateway 200 can transmit a response to the request to the client device 1100.

According to the request of the client device 1100, the gateway 200 can transmit the HTTPS PUT request message to the web server 400, S1434. The HTTPS PUT request message can include HTTP request-related information, namely information received from the client device 1 100 (URI, HTTP header, and HTTP entity body).

The web server 400 can receive an HTTPS PUT response in response to the HTTPS PUT request message S1436. The HTTPS PUT response message can include the HTTP data that the client device 1 100 has requested and/or a status code indicating the status of the HTTP data.

Through the method described above, not only the gateway 200 but also the client device can directly request change of the HTTPS security characteristic value.

Body Length Characteristic

Table 6 shows a yet another example of characteristics of the HTTP proxy service.

TABLE 6

| Characteristics Name | Requirement | Mandatory Properties | Optional Properties | Security Permissions |
|---|---|---|---|---|
| URI | M | Read, Write | | Optional |
| HTTP Headers | M | Read, Write | | Optional |
| HTTP Status Code | M | Notify, Indicate | | Optional |
| HTTP Entity Body | M | Read, Write | | Optional |
| HTTP L2CAP PSM | M | Read | | Optional |
| HTTP Control Point | M | Write, Indicate | | Optional |
| HTTPS Security | M | Read | | Optional |
| Body Length | | Read, Write, Indication/ Notification | | |

The Body Length characteristic of Table 6 can include information related to an HTTP entity body or length of an HTTP header. In other words, a client device can inform the gateway of information about data length of the data to be used by the client device through a write request, or data length of the data to be received from the gateway by the client device can be known through a read request.

Similarly, the gateway can inform the client device using the HTTP proxy service of the body length characteristic through notification or indication.

In case the data length characteristic is 0 or empty, the client device can know that there is no data to be read from the gateway; on the other hand, if the data length characteristic has a non-zero value, the client device can know that data to be received are carried in the HTTP header or HTTP entity body.

Also, in case the data length figured out through a read request, notification, or indication is shorter than the data length of the data that the client has requested from the gateway through a write request, it can be known that only part of the data received from a web server has been transmitted.

FIG. 15 illustrates one example of changing transmission methods according to data size, to which the present invention is applied.

With reference to FIG. 15, a client device can receive data length information about the data to be transmitted from a gateway and can adopt a relevant transmission method according to the data length information.

To describe the aforementioned operation specifically, the client device can obtain the data length information about the data to be transmitted from the gateway through a read request, notification, or indication S1510.

The client device can know the data length (or size) of the data to be transmitted from the gateway through the obtained data length information.

The client device can know whether the data length is 0 through the data length information S1512, in case the data length is 0, it indicates that there is no data to be transmitted from the gateway S1514. In other words, it indicates that there is no data to be transmitted since the gateway has not received data from a web server.

In case the data length is not zero, the client device can compare the obtained data length with ATT_MTU-2 value S1516. The ATT_MTU-2 value represents the maximum length of data that can be received at a time through a read request sub-procedure.

If it is found from the comparison that the data length is equal to or shorter than ATT_MTU-2 value, the client device can receive data through a read request sub procedure S1520.

In case it is found from the comparison result the data length is equal to or shorter than ATT_MTU-2 value, the client device can again compare the maximum attribute protocol data length with the data length S1522.

If it is found from the comparison that the data length is equal to or shorter than the maximum attribute protocol data length, data can be received through a read blob request S1524.

The read blob request refers to a method for transmitting data in segments in the case where the whole data cannot be transmitted at one time. This method will be described with reference to FIG. 16.

However, in case the data length exceeds the maximum attribute protocol data length, for example, in case the data length exceeds 512 bytes, the maximum data length, the client device can receive the data through the L2CAP channel S1526.

In this way, by informing of data length of the data to be transmitted, for example, length of the HTTP header or HTTP entity body through notification or indication, a transmission method can be selected in advance to receive data efficiently.

Read Blob Request

FIG. 16 illustrates one example of a method for transmitting Bluetooth data, to which the present invention is applied.

With reference to FIG. 16, in case data length exceeds ATT_MTU-2 value, data cannot be received at one time through a read request. In this case, the whole data can be obtained through continuous receiving of data blobs.

To described the aforementioned operation specifically, the client data 1 100 can request the gateway 200 to transmit data through a read request S1610.

The gateway 200 which has received the read request can transmit the data that the client has requested through a read response S1612.

However, in case data length of the data to be transmitted exceeds the ATT_MTU-2 value, the client device cannot transmit the whole data at the same time. Therefore, the gateway 200 can transmit the data by dividing it into data blobs.

For example, suppose the data to transit is "Bluetooth HTTP data transmission method", and length of the data that can be transmitted at one time is "Bluetooth HTTP".

In this case, the client device 1 100 can receive the data of "Bluetooth HTTP" through a read response S1612.

However, since the whole data has not been received yet, the client device 1 100 transmits a read blob request to the gateway S1614.

The gateway which has received the read blob request transmits "data transmission" next to the transmitted data through a read response to the client device 1100, S1616.

However, since the whole data has not been received yet, the client device 1 100 again transmits a read blob request to the gateway 200, and the gateway 200 transmits the remaining data "method" to the client device 1 100 through a read response.

Through the method above, the client device 1 100 can also receive large data from the gateway 200.

FIGS. 17 and 18 illustrate an example of a method for notifying of data length at the time of transmitting HTTP data, to which the present invention is applied.

With reference to FIG. 17, the client device can know the length of an entity body being transmitted through a read request.

Since the S1710 to S1720 steps are the same as the S1412 to S1422 steps of FIG. 14, the corresponding descriptions are omitted.

Afterwards, the gateway 200 transmits an indication message which includes a status code to the client device 1 100 S1722. Through this operation, the client device can know whether the gateway 200 has received the requested data correctly, has failed to receive the requested data, or has received the requested data incompletely.

The client device 1 100 can transmit a confirm message to the gateway 200 in response to the indication message.

The client device 1 100 can request the gateway 200 for the information that the gateway has received from the web server 400 through a read request.

In other words, the client device 1 100 can receive a URI by transmitting a read request to the gateway 200, S1724 and receive the HTTP header again through a read request S1726.

Afterwards, through a read request, the client can request the gateway 200 for length information of the HTTP entity body to transmit S1728.

According to the received length information of the HTTP entity body, the client device 1 100 can receive the HTTP entity body by using one of the methods shown in FIG. 15: read request sub procedure, read blob request, or L2CAP channel S1730.

With reference to FIG. 18, the gateway 200 can perform notification or indication by including a data length value in the status code.

Since the S1810 to S1820 steps are the same as the S1710 to S1720 steps of FIG. 17, the corresponding descriptions are omitted.

After receiving data from the web server 400, the gateway 200 can inform the client device 1 100 of the status code and length information of the received data through indication or notification S1822.

The status code can indicate whether the gateway 200 has received data from the web server 400, and the data length information can represent the length (or size) of the data received from the web server 400.

Like the status code, the data length information can be transmitted to the client device 1 100 through the indication or notification.

Similarly, the data length information can be transmitted to the client device 1 100 through the indication or notification by being included in the status code.

In this case, if the gateway 200 has transmitted the indication to the client device 1 100, the client device 1 100 can transmit a confirm message to the gateway 200 in response to the indication message.

Table 7 shows one example of the HTTP status code.

TABLE 7

|  | Status code | Length |
|---|---|---|
| Octet Order | LSO | MSO |
| Format type | Unsigned Integer | Unsigned Integer |
| Size | 2 Octet | Over 2 Octets |

The client device 1 100 can obtain the information about the data received through the data length information included in the HTTP status code or transmitted together with the HTTP status code, namely information about the length of data included in the HTTP header or HTTP entity body.

For example, in case the length value is 0 or empty, the client device 1 100 can know that there is no data to be read from the gateway 200; on the other hand, if the length value has a non-zero value, the client device 1 100 can know that data to be received are carried in the HTTP header or HTTP entity body.

Also, in case the length value figured out through a status code included in the notification or indication is shorter than the length of the data that the client has requested from the gateway through a write request, it can be known that only part of the data received from a web server has been transmitted.

As another example, the data length information can have the value of 1 or 0. In case the data length information is 0, it indicates that data has been received from the web server 400. On the other hand, in case the data length information is 1, the data transmitted from the web server 400 has exceeded the maximum transmission size, and only the data amounting to the maximum transmission size has been transmitted.

For example, in case the maximum transmission size is 512 octets, and the data length information is 1, it indicates that size of the data transmitted from the web server 400 has exceeded the 512 octets, and only the data amounting to the 512 octets has been transmitted.

In what follows, since the S1824 to S1830 steps are the same as the S524 to S528 steps of FIG. 5 or the same as the S1726 to S1730 steps of FIG. 17, the corresponding descriptions are omitted.

FIG. 19 is a flow diagram illustrating one example of transmitting an error code of an object transfer service, to which the present invention is applied.

With reference to FIG. 19, in case an error occurs while a server is providing a Bluetooth object transfer service to a client, the client can be notified of the occurrence of the error.

The object transfer service can be called an object delivery service.

To describe the aforementioned operation specifically, the server 1900 can inform the client 1910 through an advertising channel that an object delivery service is available S1912.

Physical channels for information transmission specified in the Bluetooth are divided into an advertising channel and a data channel, where the advertising channel comprises three channels, and the data channel comprises 37 channels.

The advertising channel can provide pairing information for neighboring clients. For example, the server 1900 can inform the neighboring clients through the advertising channel that the server 1900 is capable of providing the object delivery service S1912.

At this time, in case the client 1910 intends to receive the object delivery service, the client 1910 transmits a connection request for pairing to the server 1900, S1914.

Afterwards, the client 1910 can request the server for the information about object name through a read request to obtain information about a current object that the object delivery service is providing S1914.

In response to the request, the server 1900 can transmit the name of the object that the object delivery service is currently providing to the client through a read response S1916.

To obtain the information of the next object, the client 1916 which has received the object name can request the server 1900 to replace the current object with the next object by transmitting an object list control point for object change to the server 1900 S1918.

However, in case the server 1900 is unable to generate information about the next object S1920, an error code can be transmitted to the client 1910 to inform of the situation.

The server 1900 may fail to generate information about a new object due to lack of resources of the server 1900, for example, CPU power, lack of memory, and so on.

An error code as shown in Table 8 can be transmitted.

TABLE 8

| Name | Error Code | Description |
| --- | --- | --- |
| Concurrency Limit Exceeded | 0x83 | The Server is unable to service the Read Request or Write Request because it exceeds the concurrency limit of the service |

By using the method above, the server 1900 can inform the client 1910 of what has caused the error.

Various substitutions, modifications, and changes can be made to the present invention described above by those skilled in the art to which the present invention belongs without leaving the technical scope of the present invention; therefore, the present invention is not limited to the embodiments above and appended drawings.

The invention claimed is:

1. A method for transmitting and receiving data by a gateway with web server using Bluetooth in wireless communication system, the method comprising:
   receiving a first write request including HTTP (Hyper Text Transfer Protocol) request-related information from a first client device;
   transmitting to a web server HTTP request-related information generated on the basis of information included in the received first write request;
   receiving an HTTP response message in response to the HTTP request-related information from the web server;
   notifying the first client device of an HTTP status code indicating the status of data included in the received HTTP response message; and
   receiving a read request requesting data transmission based on information included in the HTTP status code from the first client device,
   wherein an error response is transmitted to a different client device, when a second write request is received from the different client device while the first write request is being received.

2. The method of claim 1, wherein the error response indicates that the gateway performs an operation for generating the HTTP request-related information with the first client device or that resources are not enough since the gateway is performing an operation for generating the HTTP request-related information.

3. The method of claim 1, wherein step of the receiving a first write request further comprises,
   receiving a URI (Universal Resource Identifier) write request from the first client device;
   transmitting a URI write response in response to the received URI write request to the first client device;
   receiving an HTTP header write request from the first client device;
   transmitting an HTTP header write response in response to the received HTTP header write request to the first client device;
   receiving an HTTP entity body write request from the first client device;
   transmitting an HTTP entity body write response in response to the received HTTP entity body write request to the first client device;
   receiving an HTTP control point request commanding a specific operation related to a HTTP request message from the first client device; and
   transmitting an HTTP control point response in response to the received HTTP control point request to the first client device.

4. The method of claim 1, wherein the step of receiving a read request further comprises,
   receiving an HTTP header read request from the first client device;
   transmitting an HTTP header read response in response to the HTTP header read request to the first client device;
   receiving an HTTP entity body read request from the first client device; and
   transmitting an HTTP entity body read response in response to an HTTP entity body read request to the first client device.

5. The method of claim 1, wherein the data includes at least one of a header or an entity body received from the web server.

6. The method of claim 1, wherein the HTTP status code includes information related to data length.

7. The method of claim 6,
   wherein the information related to data length includes 0 or 1, and indicates that the data has been received, when the information related to the data length is 1.

8. The method of claim 6,
   wherein the information related to data length includes data length,
   wherein the data is transmitted to the first client device through a read request procedure, when the data length is equal to or shorter than ATT_MTU-2 value, and
   wherein the ATT_MTU-2 value indicates the maximum data length that can be transmitted at a time through the read request procedure.

9. The method of claim 6,
   wherein the information related to data length includes data length,
   wherein the data is transmitted to the first client device through a read blob request procedure, when the data length exceeds ATT_MTU-2 value and is equal to or shorter than the maximum ATT data length, and
   wherein the maximum ATT data length indicates the maximum data size that can be transmitted through attribute protocol.

10. The method of claim 6,
    wherein the information related to data length includes data length, and wherein the data is transmitted to the first client device through L2CAP CoC (Logical Link Control and Adaptation Protocol Connection Oriented Channel), when the data length exceeds the maximum ATT data length.

11. The method of claim 1, wherein the HTTP status code is notified with information related to data length.

12. The method of claim 1, further comprising
receiving a request message requesting a client ID value from the first client device;
transmitting a response message in response to the request message; and
receiving a change request message requesting changing the client ID value to first client device information from the first client device, when the client ID value is NULL.

13. The method of claim 12,
wherein the first client device information includes at least one of a user ID or ID of the first client device.

14. The method of claim 12, further comprising,
notifying other client devices connected to the gateway of the changed client ID.

15. The method of claim 12,
wherein the changed client ID is changed to NULL at the request of the first client or after a specific time is passed.

16. The method of claim 1, further comprising
receiving a request message requesting a protected value indicating whether or not to use of other client from the first client device;
transmitting a response message in response to the request message; and
receiving a request message requesting change of the protected value from the first client device, when the protected value is No.

17. The method of claim 16, further comprising,
notifying other client devices connected to the gateway of the changed protected value.

18. The method of claim 16,
wherein the changed protected value is changed to No at the request of the first client or after a specific time is passed.

19. A gateway in a method for transmitting and receiving data by a gateway with web server using Bluetooth in wireless communication system, the gateway comprising:
a communication unit for transmitting and receiving a signal to and from an external entity in a wired and/or wireless manner; and
a controller functionally connected to the communication unit,
wherein the controller is configured to,
receive a first write request including HTTP (Hyper Text Transfer Protocol) request-related information from a first client device,
generate the HTTP request-related information based on information included in the received first write request,
transmit the generated HTTP request-related information to a web server,
receive an HTTP response message in response to the HTTP request-related information from the web server,
notify the first client device of an HTTP status code indicating the status of data included in the received HTTP response message, and
receives a read request requesting data transmission based on information included in the HTTP status code from the first client device,
wherein an error response is transmitted to a different client device, when a second write request is received from the different client device while the first write request is being received.

* * * * *